United States Patent
Ikeda

(10) Patent No.: US 12,450,399 B2
(45) Date of Patent: Oct. 21, 2025

(54) AUTHENTICATION DEVICE AND DRIVING METHOD OF AUTHENTICATION DEVICE

(71) Applicant: Magnolia White Corporation, Tokyo (JP)

(72) Inventor: Masataka Ikeda, Tokyo (JP)

(73) Assignee: MAGNOLIA WHITE CORPORATION, Tokyo (JP)

(*) Notice: Subject to any disclaimer, the term of this patent is extended or adjusted under 35 U.S.C. 154(b) by 282 days.

(21) Appl. No.: 18/119,827

(22) Filed: Mar. 10, 2023

(65) Prior Publication Data

US 2023/0315914 A1    Oct. 5, 2023

(30) Foreign Application Priority Data

Mar. 29, 2022 (JP) ................................. 2022-054103

(51) Int. Cl.
| | |
|---|---|
| *G06F 21/73* | (2013.01) |
| *G06F 21/32* | (2013.01) |
| *H04L 9/32* | (2006.01) |

(52) U.S. Cl.
CPC .............. *G06F 21/73* (2013.01); *G06F 21/32* (2013.01); *H04L 9/3278* (2013.01)

(58) Field of Classification Search
CPC ......... G06F 21/70–73; G06F 21/30–32; H04L 9/3278; H04L 9/3271
USPC ................................................. 713/188–189
See application file for complete search history.

(56) References Cited

U.S. PATENT DOCUMENTS

| | | | | |
|---|---|---|---|---|
| 10,103,895 | B1* | 10/2018 | Tseng | ..................... H04L 9/3278 |
| 10,679,017 | B2* | 6/2020 | Yokoi | .................. B42D 25/305 |
| 11,604,869 | B2* | 3/2023 | Goel | ........................ G06F 21/73 |
| 2015/0098268 | A1* | 4/2015 | Yabuuchi | .............. G11C 11/418 |
| | | | | 365/154 |
| 2017/0155802 | A1* | 6/2017 | Takahashi | ............... H04N 1/442 |
| 2018/0115723 | A1 | 4/2018 | Takayanagi et al. | |
| 2021/0184871 | A1* | 6/2021 | Kim | ......................... G06F 21/73 |
| 2021/0342423 | A1* | 11/2021 | Yoneda | .............. G06V 40/1318 |
| 2023/0237831 | A1* | 7/2023 | Yamazaki | ........... G06V 40/1318 |
| | | | | 382/124 |

FOREIGN PATENT DOCUMENTS

| | | |
|---|---|---|
| JP | 2019-180003 A | 10/2019 |
| WO | 2016/167076 A1 | 10/2016 |

* cited by examiner

*Primary Examiner* — Bharat Barot
(74) *Attorney, Agent, or Firm* — XSENSUS LLP

(57) ABSTRACT

An authentication device includes a display device and a control circuit. The display device includes a first transistor having a gate and a source electrode, a photoelectric conversion element having a first electrode connected to a drain electrode of the first transistor, and a capacitive element connected between the gate electrode and the drain electrode. The control circuit controls resetting the drain electrode, initializing the gate electrode, storing first charge corresponding to the threshold of the first transistor in the capacitive element, setting the threshold of the first transistor, transmitting a signal including data for causing the photoelectric conversion element to emit to the gate electrode, adding second charge corresponding data to the first charge, causing the photoelectric conversion element to emit, reading a voltage corresponding to the first charge and the second charge, and generating a PUF-ID using the voltage.

12 Claims, 27 Drawing Sheets

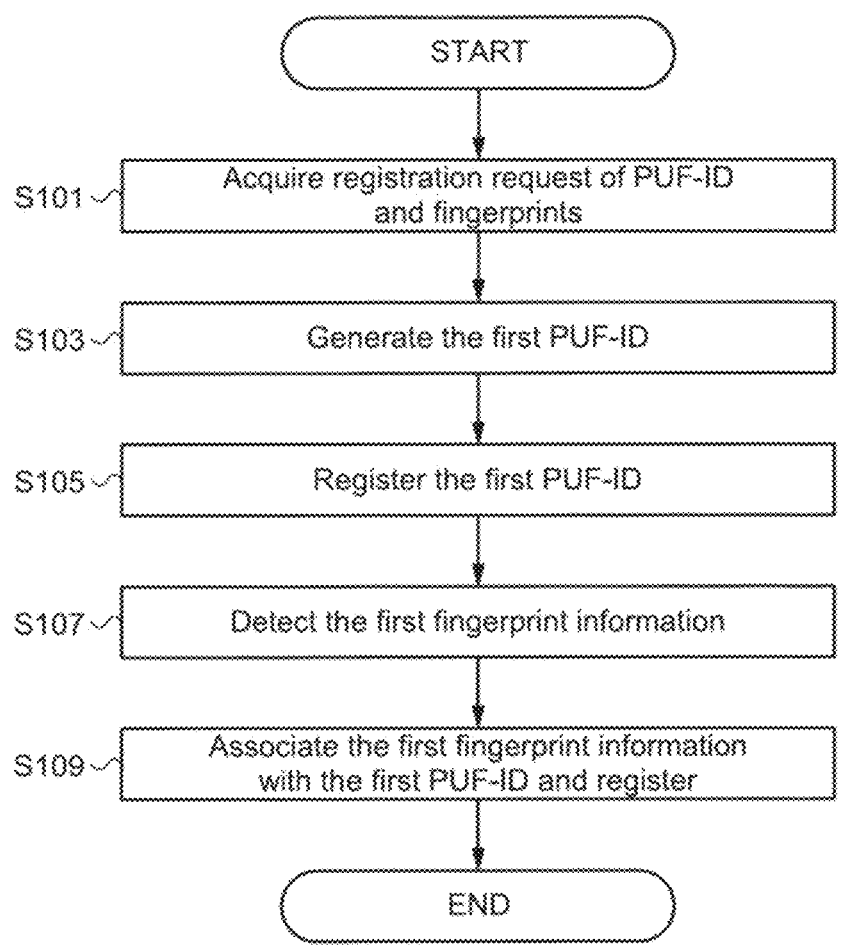

FIG. 23
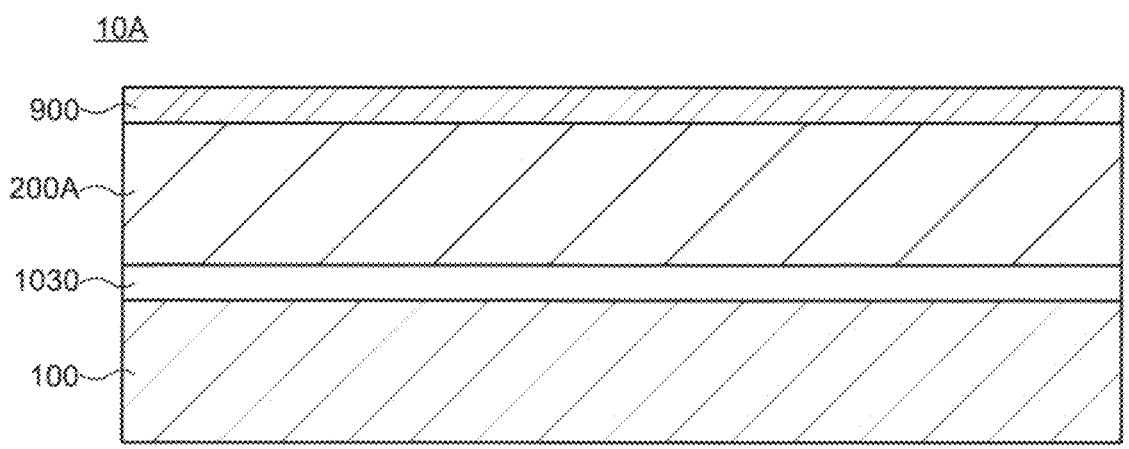
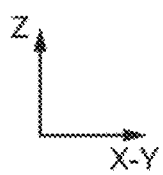

AUTHENTICATION DEVICE AND DRIVING METHOD OF AUTHENTICATION DEVICE

CROSS-REFERENCE TO RELATED APPLICATIONS

This application claims the benefit of priority to Japanese Patent Application No. 2022-054103 filed on Mar. 29, 2022, the entire contents of which are incorporated herein by reference.

FIELD

An embodiment of the present invention relates to an authentication device and a driving method of the authentication device.

BACKGROUND

In recent years, in an electronic component including a semiconductor integrated circuit, unauthorized use such as intrusion, attacking, outflow of data, and alteration of data by a third party has become an issue of electronic devices including the electronic component, or a system using them.

In order to prevent unauthorized use of the electronic component, the electronic device, or the system using them, for example, a solid-state imaging device capable of enhancing individual authentication of a solid-state imaging device using a PUF (Physical Unclonable Function) and ensuring safety is known.

SUMMARY

An authentication device includes a display device including at least a first transistor, a source signal line electrically connected to a gate electrode of the first transistor, a power line electrically connected to a source electrode of the first transistor, a photoelectric conversion element having a first electrode connected to a drain electrode of the first transistor, and a capacitive element connected between the gate electrode and the drain electrode; and
a control circuit configured to control
driving in a fourth period including resetting the drain electrode, initializing the gate electrode of the first transistor, storing a first charge corresponding to the threshold of the first transistor in the capacitive element, and correcting the threshold of the first transistor,
driving in a fifth period after the fourth period including transmitting a signal containing image data for causing the photoelectric conversion element to emit light to the gate electrode, and adding a second charge corresponding to the image data to the first charge of the capacitive element; and
driving in a sixth period after the fifth period including causing the photoelectric conversion element to emit light, reading out a voltage corresponding to the first charge and the second charge, and generating a PUF-ID using the voltage.

A method of driving an authentication device includes a display device including at least a first transistor, a source signal line electrically connected to a gate electrode of the first transistor, a power line electrically connected to a source electrode of the first transistor, a photoelectric conversion element having a first electrode connected to a drain electrode of the first transistor, and a capacitive element connected between the gate electrode and the drain electrode; and a control circuit generating a PUF-ID and configured to control;
reset of the drain electrode;
initializing the gate electrode of the first transistor;
storing a first charge corresponding to the threshold of the first transistor in the capacitive element;
correcting the threshold of the first transistor;
transmitting a signal containing image data for causing the photoelectric conversion element to emit light to the gate electrode;
adding a second charge corresponding to the image data to the first charge of the capacitive element;
causing the photoelectric conversion element to emit light;
reading out a voltage corresponding to the first charge and the second charge; and
generating a PUF-ID using the voltage.

BRIEF DESCRIPTION OF DRAWINGS

FIG. 21 is a flowchart showing an authentication method using an authentication device according to an embodiment of the present invention.

FIG. 23 is a schematic cross-sectional view showing a configuration of an authentication device according to a second embodiment of the present invention.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. In addition, although the drawings, the widths, thicknesses, shapes, configurations, and the like of the respective portions may be schematically represented in comparison with the actual embodiments for clarity of the description, the drawings are merely examples, and do not limit the interpretation of the present invention. In addition, the terms "first" and "second" appended to each element are convenience signs used to distinguish each element, and do not have any further meaning unless otherwise specified.

In recent years, a display device in which each of a plurality of pixels is formed of a light-emitting element has attracted attention. For example, the light-emitting element is a light-emitting diode (LED), a minute light-emitting diode (micro LED), or an organic electroluminescence (EL) device, and the like. In this display device as well, it is essential to enhance individual authentication and ensure security in order to suppress unauthorized use using the display device. Therefore, an object of an embodiment of the present invention is to provide an authentication device using a PUF in order to suppress unauthorized use using a display device. In addition, an object of an embodiment of the present invention is to provide an authentication device using a PUF in order to suppress unauthorized use using a display device.

Some embodiments described below exemplify an authentication device using a PUF and a driving method of the authentication device using a PUF in order to suppress unauthorized use using a display device.

1. First Embodiment

[1-1. Configuration of Authentication Device 10]

Figure 1:
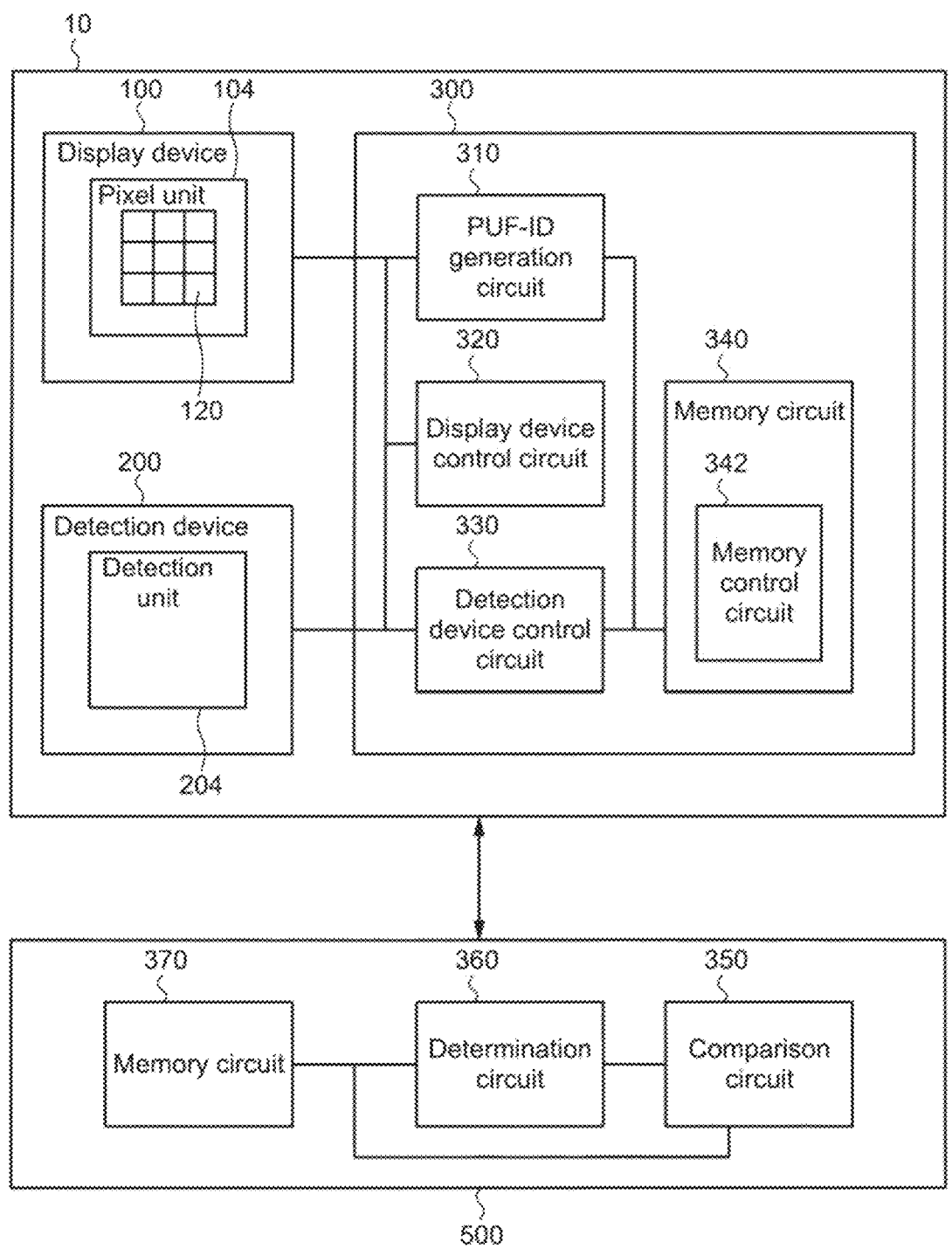
FIG. 1 is a schematic diagram showing a configuration of an authentication device and a server according to an embodiment of the present invention.
Figure 2:
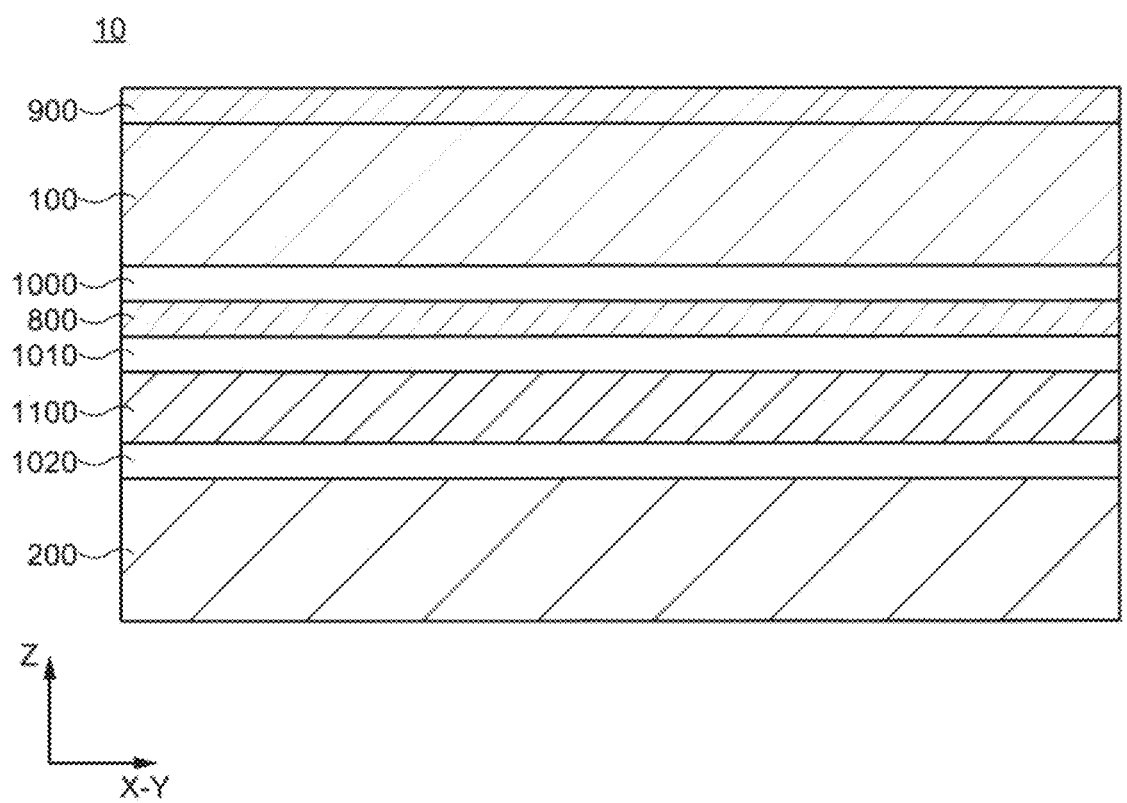
FIG. 2 is a schematic cross-sectional view showing a configuration of an authentication device according to an embodiment of the present invention.

FIG. 1 is a schematic diagram showing a configuration of an authentication device 10 and a server 500 according to an embodiment of the present invention. FIG. 2 is a schematic cross-sectional view showing a configuration of the authentication device according to an embodiment of the present invention. The configuration of the authentication device 10 is not limited to the configuration shown in FIG. 1 and FIG. 2.

As shown in FIG. 1, the authentication device 10 includes a display device 100, a detection device 200, and a control device 300. The display device 100 and the detection device 200 are electrically connected to the detection device 200. The server 500 includes at least a comparison circuit 350, a determination circuit 360, and a memory circuit 370. The comparison circuit 350 is electrically connected to the determination circuit 360, and the comparison circuit 350 and the determination circuit 360 are electrically connected to the memory circuit 370. The authentication device 10 is electrically connected to the server 500.

The authentication device 10 may be electrically connected to the server 500 by two-way communication via a wireless network. For example, in the case where the authentication device 10 is connected to the server 500 by two-way communication via a wireless network, the authentication device 10 is portable.

For example, the server 500 is a computer that provides an application or a program to the authentication device 10 via a wireless network. For example, when the authentication device 10 requests the server 500 to provide an application, the server 500 provides an installation file of the application to the authentication device 10. The user can install an application on the authentication device 10 and use the application installed on the authentication device 10. For example, if there is a request for the provision of an application or a program related to operation modes by the user or the authentication device 10, the server 500 provides the installation file or program of the application to the authentication device 10. As a result, the user can cause the authentication device 10 to execute the program related to operation modes by installing the application in the authentication device 10 and using the application installed in the authentication device 10. In addition, although the details will be described later, for example, the operation modes executable by the server 500 are a driving mode using a driving method for displaying images on the authentication device 10, a driving mode using a driving method for generating a PUF-ID of the authentication device 10, and an authentication mode using an authentication method using the authentication device 10.

The display device 100 includes a display unit 104 and a plurality of pixels 120 arranged in the display unit 104. The detection device 200 includes at least a detection unit 204. The control device 300 includes a PUF-ID generation circuit 310, a display device control circuit 320, a detection device control circuit 330, and a memory circuit 340.

The display device 100 includes the display unit 104 and the plurality of pixels 120 arranged in the display unit 104. The display device 100 receives an image data signal and displays an image on the display unit 104. In addition, the display device 100 generates a read-out data signal containing characteristics of the plurality of pixels 120. The detection device 200 includes the detection unit 204. The detection device 200 receives the read-out data signal using the detection unit 204 and transmits a plurality of read-out data signals which have been read out to the detection device control circuit 330. For example, the detection device control circuit 330 detects an object to be detected (for example, a user's own finger, a user's own fingerprint information, and a touch pen) using the plurality of read-out data signals.

The PUF-ID generation circuit 310 is electrically connected to the display device 100, the detection device 200, the display device control circuit 320, the detection device control circuit 330, and the memory circuit 340. For example, the PUF-ID generation circuit 310 receives the plurality of read-out data signals from the display device 100 and generates an identifier (ID) specific to the display device 100, that is, the PUF-ID, by using the plurality of read-out data signals. In addition, the PUF-ID generation circuit 310 transmits a signal (PUF-ID signal) containing the generated PUF-ID to the memory circuit 340.

The display device control circuit 320 is electrically connected to the display device 100, the detection device 200, and the detection device control circuit 330. For example, the display device control circuit 320 generates signals that control the operations of the circuit, such as the image data signal, a scanning signal, and a source voltage, and the like. In addition, for example, the display device control circuit 320 transmits a plurality of image data signals to the display device 100, reads out the plurality of read-out data signals from the display device 100, and transmits the plurality of read-out data signals which have been read out to the PUF-ID generation circuit 310.

The detection device control circuit 330 is electrically connected to the display device 100, the detection device 200, and the memory circuit 340. For example, the detection device 200 uses a photoelectric conversion element such as an OPD (Organic photo diode) or a PIN (Positive Intrinsic Negative) photodiode, and the detection device control circuit 330 generates a signal related to biological information such as fingerprint information from a signal (voltage) corresponding to a signal (charge) output from the photoelectric conversion element output from the detection device 200.

For example, the memory circuit 340 is electrically connected to the comparison circuit 350. For example, the memory circuit 340 includes a volatile memory (not shown) and a memory control circuit 342 that controls the memory circuit 340. The memory control circuit 342 receives the PUF-ID signal and a detection signal, and associates and stores the information contained in each signal. For example, the memory control circuit 342 associates the information (e.g., the PUF-ID, fingerprint information, and the like) contained in the PUF-ID signal and detection signal based on a request from the user, and stores the associated information in the memory circuit 340. In addition, the memory control circuit 342 controls the transmission of the information (e.g., the PUF-ID, fingerprint information, and the like) contained in the PUF-ID signal and detection signal to the comparison circuit 350 based on a request from the user.

The comparison circuit 350 is electrically connected to the determination circuit 360. Although details will be described later, the comparison circuit 350 receives the PUF-ID signal and the detection signal, compares the information contained in the PUF-ID signal and detection signal, and generates a comparison result based on a request from the user. For example, the comparison circuit 350 compares an associated first PUF-ID and first fingerprint information with an associated second PUF-ID and second fingerprint information to generate a comparison result. In addition, the comparison circuit 350 transmits the comparison result to the determination circuit 360 based on a request from the user. In this case, the comparison circuit 350 may transmit the comparison result to the memory circuit 370. The memory circuit 370 stores the comparison result. For example, the comparing result contains information in which the first PUF-ID and the first fingerprint information match or do not match (inconsistent information) the second PUF-ID and the second fingerprint information. Further, for example, the memory circuit 370 includes a volatile memory and a non-volatile memory.

Although details will be described later, the determination circuit 360 receives the comparison result and determines whether the comparison result matches or not (mismatches) using the comparison result. For example, in the case when the information in which the first PUF-ID and the first fingerprint information match the second PUF-ID and the second fingerprint information is contained, the determination circuit 360 determines that the information matches (first determination result), and in the case when the information in which the first PUF-ID and the first fingerprint information match the second PUF-ID and the second fingerprint information is contained, the determination circuit 360 determines that the information does not match (second determination result). The determination circuit 360 may transmit the first determination result and the second determination result to the memory circuit 370. The memory circuit 370 stores the first determination result and the second determination result.

In addition, as shown in FIG. 2, the authentication device 10 further includes an interference filter 800, a polarizing plate 900, an adhesive sheet 1000, an adhesive sheet 1010, an adhesive sheet 1020, and a collimator 1100.

The detection device 200, the collimator 1100, the interference filter 800, the display device 100, and the polarizing plate 900 are arranged in this order from the bottom to top with respect to a direction Z. Specifically, the collimator 1100 is arranged on the upper layer of the detection device 200. The adhesive sheet 1020 is arranged between the collimator 1100 and the detection device 200, and adheres the collimator 1100 to the detection device 200. The interference filter 800 is arranged on the upper layer of the collimator 1100. The adhesive sheet 1010 is arranged between the interference filter 800 and the collimator 1100, and adheres the interference filter 800 to the collimator 1100. The display device 100 is arranged on the upper layer of the interference filter 800. The adhesive sheet 1000 is arranged between display device 100 and the interference filter 800, and adheres the display device 100 to the interference filter 800. The polarizing plate 900 is arranged on the upper layer of the display device 100. The polarizing plate 900 includes the adhesive sheets, and the polarizing plate 900 is adhered to the display device 100 using the adhesive sheet.

In the first embodiment, the direction X intersects the direction Y, and the direction Z intersects the direction X and the direction Y (X-Y plane). In addition, in the first embodiment, the direction X is referred to as the first direction, the direction Y is referred to as the second direction, and the direction Z is referred to as the third direction.

For example, the interference filter 800 includes a multilayer film in which a plurality of dielectrics is stacked. For example, the interference filter 800 transmits a specific light wavelength using the interference phenomenon of reflected light occurring at an interface between the dielectric and the detection device 200. By including the interference filter 800 in the authentication device 10, it is possible to narrow the band of the transmitted light. As a result, for example, the authentication device 10 can clearly detect the unevenness of a fingerprint. Using the authentication device 10 makes it possible to improve the accuracy of fingerprint authentication.

For example, the collimator 1100 can convert the reflected light into parallel light. Although details will be described later, for example, the collimator 1100 converts the light (reflected light) reflected by using light (transmitted light) transmitted through a micro lens 274 (see FIG. 20) into parallel light, and transmits the parallel light to the detection device 200 located on the lower layer of the collimator 1100.

For example, a circular polarizing plate can be used as the polarizing plate 900 in the authentication device 10.

[1-2. Configurations of Display Device 100 and Control Device 300]

Figure 3:
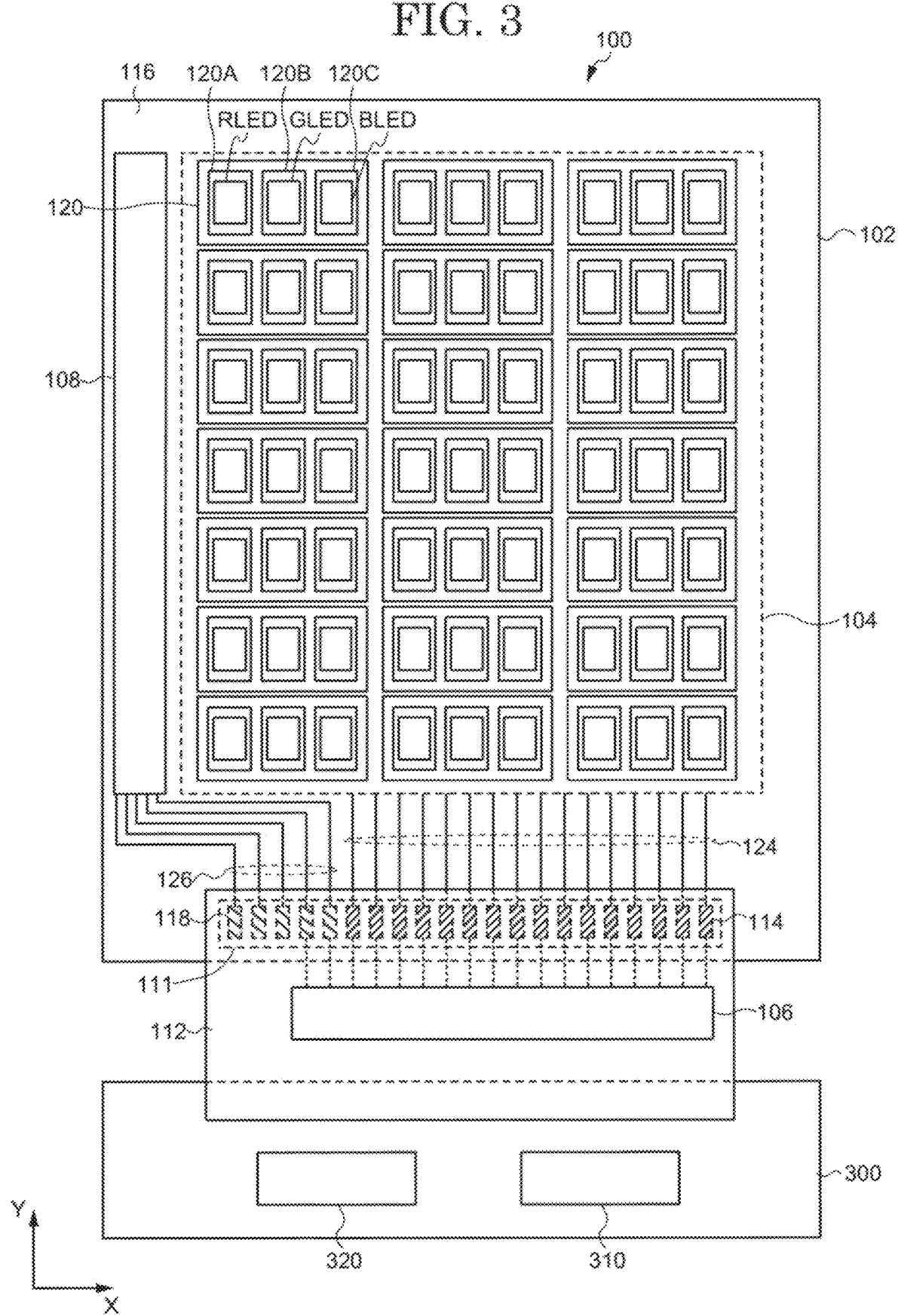
FIG. 3 is a schematic diagram showing a configuration of a display device and a control device according to an embodiment of the present invention.
Figure 4:
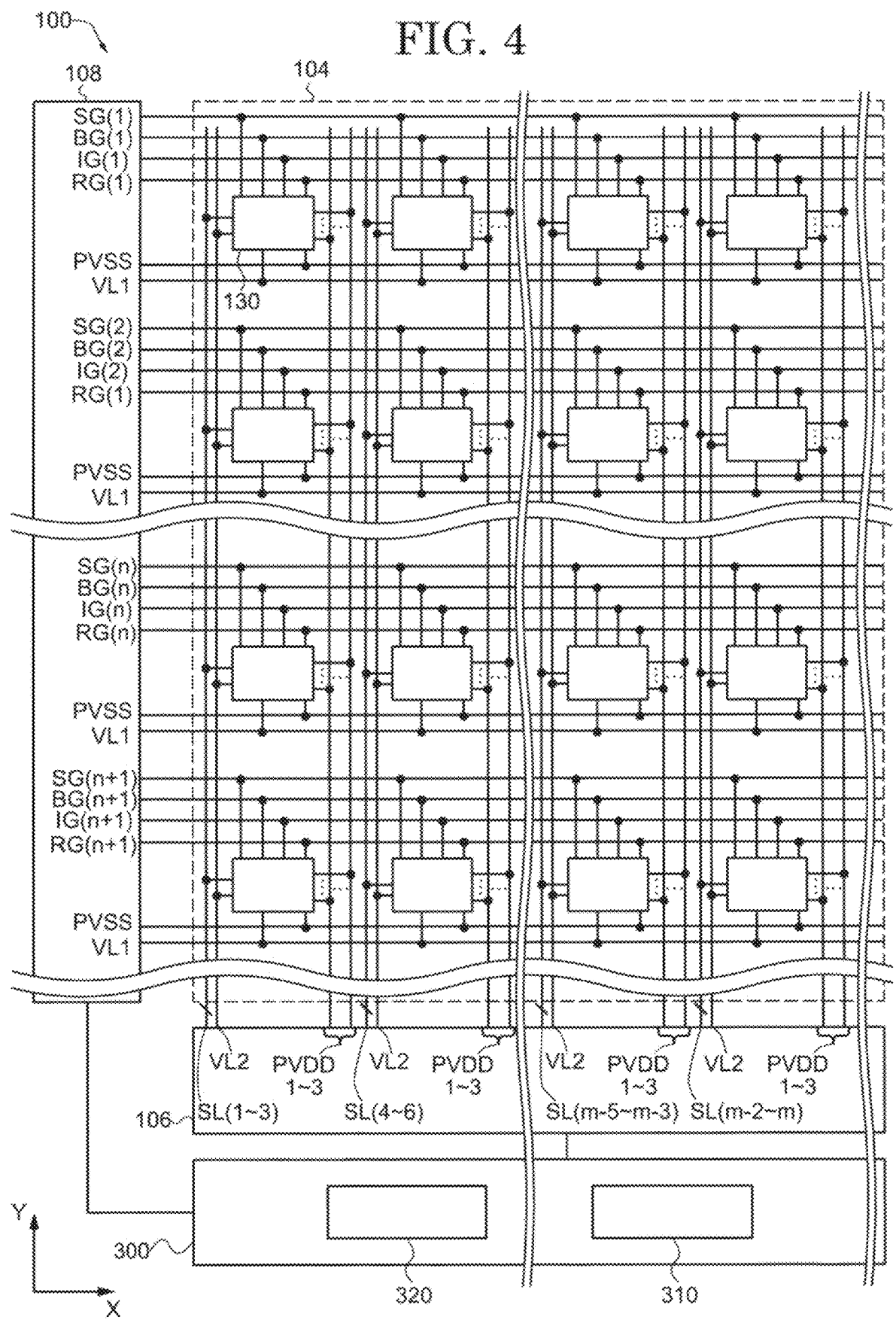
FIG. 4 is a schematic diagram showing a configuration of a display device and a control device according to an embodiment of the present invention.

FIG. 3 and FIG. 4 are schematic diagrams showing configurations of the display device 100 and the control device 300 according to an embodiment of the present invention. The configurations of the display device 100 and the control device 300 are not limited to the configurations shown in FIG. 3 and FIG. 4. The same or similar configurations as those in FIG. 1 and FIG. 2 will not be described here.

As shown in FIG. 3, the display device 100 is roughly classified into the display unit 104 and a peripheral unit 116. The display device 100 includes a substrate 102, a driver IC 106, a scanning signal line driving circuit 108, a flexible printed circuit (FPC, Flexible Printed Circuit) board 112, the plurality of pixels 120, a wiring 124, and a wiring 126. As described above, the display unit 104 includes the plurality of pixels 120. The peripheral unit 116 includes the driver IC 106, the scanning signal line driving circuit 108, a terminal unit 111, the FPC board 112, and a plurality of wirings 124. A plurality of wirings 126 is included in both the display unit 104 and the peripheral unit 116. The terminal unit 111 includes a plurality of terminals 114 and a plurality of terminals 118. The scanning signal line driving circuit 108, the plurality of terminals 114, the plurality of terminals 118, and the plurality of pixels 120 are arranged on an upper surface of the substrate 102. The driver IC 106 is arranged on an upper surface of the FPC board 112.

The plurality of pixels 120 is arranged in a matrix in the direction X and the direction Y intersecting the direction X. Each of the plurality of pixels 120 includes a plurality of sub-pixels 120A, 120B, and 120C. For example, the sub-pixel 120A has a light-emitting element RLED that emits red light, the sub-pixel 120B has a light-emitting element GLED that emits green light, and the sub-pixel 120C has a light-emitting element BLED that emits blue light.

In the authentication device 10, as an example, the scanning signal line driving circuit 108 is arranged on the upper surface of the substrate 102, and the driver IC 106, which is an IC chip, is arranged on the upper surface of the FPC board 112. The scanning signal line driving circuit 108 and the driver IC 106 are not limited to the arrangement shown in the first embodiment. For example, the driver IC 106 may be arranged on the upper surface of the substrate 102, and part or all of the driving circuits included in the driver IC 106 may be formed directly on the upper surface of the substrate 102. In addition, part or all of the driving circuits included in the scanning signal line driving circuit 108 may be formed on a circuit substrate that is different from the substrate 102, and the circuit substrate may be arranged on the upper surface of the FPC board 112. Although details will be described later, the light-emitting element RLED, the light-emitting element GLED, the light-emitting element BLED, and various semiconductor elements for controlling the light-emitting elements are formed on the upper surface of the substrate 102.

For example, the plurality of wirings 124 is electrically connected to the plurality of sub-pixels 120A, 120B, and 120C. In addition, the plurality of wirings 124 is electrically connected to the plurality of terminals 114 in a one-to-one manner. For example, similar to the plurality of wirings 124, the plurality of wirings 126 is electrically connected to the plurality of terminals 118 in a one-to-one manner. For example, the driver IC 106 is electrically connected to the plurality of terminals 114. The terminal unit 111 (the plurality of terminals 114 and the plurality of terminals 118) is electrically connected to the FPC board 112 and is electrically connected to the control device 300.

For example, the scanning signal line driving circuit 108 and the driver IC 106 drive the transistors (see FIG. 7) included in each pixel 120 by using the signal and source voltage supplied from the control device 300 to cause the light-emitting element RLED to emit light or not to emit light. As a result, the display device 100 can display an image on the display unit 104. In addition, the scanning signal line driving circuit 108 and the driver IC 106 drive the transistor (see FIG. 7) included in each pixel 120 by using the signal and source voltage supplied from the control device 300 to read out the read-out data signal containing characteristics of each pixel 120.

As shown in FIG. 4, the scanning signal line driving circuit 108 commonly supplies a scanning signal SG (n), a light emission control signal BG (n), an initialization control signal IG (n), a reset signal RG (n), and a first reset signal VL1 to a plurality of pixel circuits 130 located in the n-th row in the display unit 104. The first reset signal VL1 supplies a voltage Vrst to the plurality of pixel circuits 130 located in the n-th row in the display unit 104. A reference voltage line PVSS commonly supplies the reference voltage VSS to the plurality of pixel circuits 130. Although details will be described later, the pixel circuit 130 is a circuit for driving the pixel 120.

The driver IC 106 commonly supplies an image data signal SL (m) and a second reset signal VL2 to the plurality of pixel circuits 130 located in the m-th column in the display unit 104. The second reset signal VL2 supplies a voltage Vini to the plurality of pixel circuits 130 located in the m-th column in the display unit 104. A first drive power line PVDD1 supplies a first drive voltage VDDH1 (see FIG. 6) to the plurality of pixel circuits 130 located in the m-th column in the display unit 104. A second drive power line PVDD2 supplies a second drive voltage VDDH2 (see FIG. 6) to the plurality of pixel circuits 130 located in the m-th column in the display unit 104. A third drive power line PVDD3 supplies a third drive voltage VDDH3 (see FIG. 6) to the plurality of pixel circuits 130 located in the m-th column in the display unit 104. In the authentication device 10, a voltage of the image data signal is called Vsig (m) or VsIG (n). The image data signal SL (m) is determined based on the image displayed on the display unit 104. The numerical value m is an arbitrary integer of 6 or more, and the numerical value n is an arbitrary integer of 1 or more.

Although the voltage Vrst and the voltage Vini of the authentication device 10 are fixed voltages as an example, the voltage Vrst and the voltage Vini of the authentication device 10 may change over time. In addition, in the authentication device 10, although the scanning signal line driving circuit 108 supplies the reset signal RG to the plurality of pixel circuits 130 and the driver IC 106 supplies the second reset signal VL2 to the plurality of pixel circuits 130 as an example, the signals supplied by the scanning signal line driving circuit 108 and the driver IC 106 are not limited to the example shown here. For example, the driver IC 106 may supply the reset signal RG to the plurality of pixel circuits 130, and the scanning signal line driving circuit 108 may supply the second reset signal VL2 to the plurality of pixel circuits 130. In the authentication device 10, the voltage Vrst may be referred to as a reset voltage and the voltage Vini may be referred to as an initialization voltage.

[1-3. Configuration of Driver IC 106]

Figure 5:
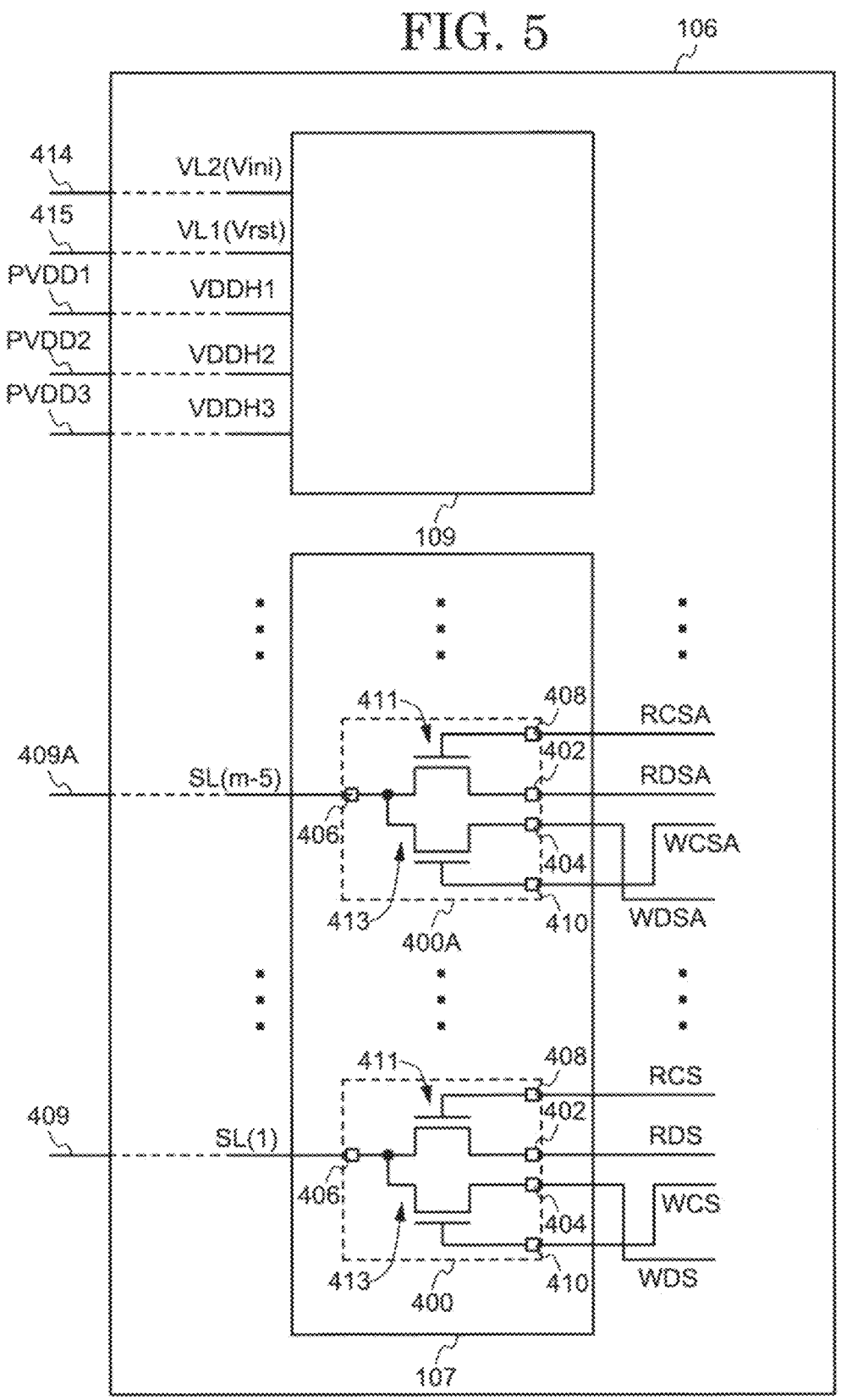
FIG. 5 is a schematic diagram showing a configuration of a driver IC according to an embodiment of the present invention.

FIG. 5 is a schematic diagram showing a configuration of the driver IC 106 according to an embodiment of the present invention. The configuration of the driver IC 106 is not limited to the configuration shown in FIG. 5. Descriptions of the same or similar configurations as those in FIG. 1 to FIG. 4 will be omitted.

The driver IC 106 includes a read/write selection circuit 107 and a power generation circuit 109. The read/write selection circuit 107 includes a plurality of selection circuits 400. Each of the plurality of selection circuits 400 includes a read-out terminal 402, a write terminal 404, a data signal line connection terminal 406, a read-out control terminal 408, a write control terminal 410, a first transistor 411, and a second transistor 413. A gate electrode of the first transistor 411 is electrically connected to the read-out control terminal 408, a first electrode of the first transistor 411 is electrically connected to the data signal line connection terminal 406, and a second electrode of the first transistor 411 is electrically connected to the read-out terminal 402. A gate electrode of the second transistor 413 is electrically connected to the write control terminal 410, a first electrode of the second transistor 413 is electrically connected to the data signal line connection terminal 406, and a second electrode of the second transistor 413 is electrically connected to the write terminal 404.

The selection circuit 400 supplies a data signal SL (1) from the data signal line connection terminal 406 to a data signal line 409. In addition, in the selection circuit 400, the data signal SL (1) is received from the data signal line 409 to the data signal line connection terminal 406. The data signal SL includes an image data signal WDS containing image data and a read-out data signal RDS containing the characteristics of the pixel 120. A read-out control signal RCS is supplied from the display device control circuit 320 (see FIG. 7) to the read-out control terminal 408. The read-out data signal RDS is supplied from the data signal line 409 to the PUF-ID generation circuit 310 (see FIG. 7). A write control signal WCS is supplied from the display device control circuit 320 (see FIG. 7) to the write control terminal 410. The image data signal WDS is supplied from the display device control circuit 320 (see FIG. 7) to the data signal line 409.

Similar to the selection circuit 400, a selection circuit 400A supplies a data signal SL (m-5) to a data signal line 409A and receives the data signal SL (m-5) from the data signal line 409A. The data signal SL (m-5) includes an image data signal WDSA containing image data and a read-out data signal RDSA containing the characteristics of the pixel 120. A read-out control signal RCSA is supplied from the display device control circuit 320 (see FIG. 7) to the read-out control terminal 408. The read-out data signal RDSA is supplied from the data signal line 409 to the PUF-ID generation circuit 310 (see FIG. 7). A write control signal WCSA is supplied from the display device control circuit 320 (see FIG. 7) to the write control terminal 410. The image data signal WDSA is supplied from the display device control circuit 320 (see FIG. 7) to the data signal line 409A.

Figure 7:
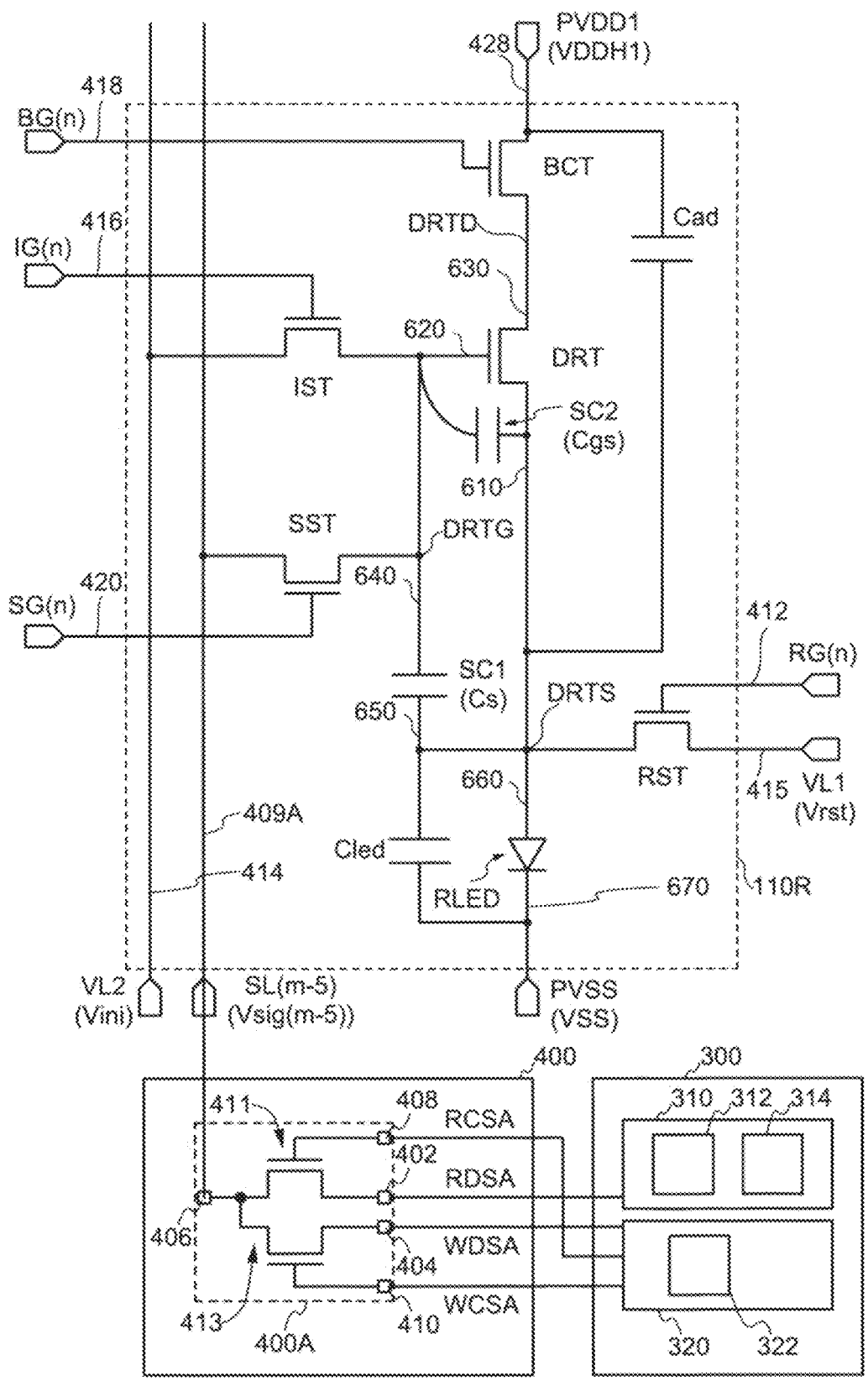
FIG. 7 is a circuit diagram showing a circuit configuration of a sub-pixel according to an embodiment of the present invention.

Further, the display device control circuit 320 includes a DA converter 322 (see FIG. 7). The display device control circuit 320 generates an analog image data signal WDS using the DA converter 322. In addition, the PUF-ID generation circuit 310 includes an integration circuit 312 (see FIG. 7) and an AD converter 314. The PUF-ID generation circuit 310 may integrate the voltage included in the read-out data signal RDSA at a predetermined time using the integration circuit 312, and then convert the integrated voltage into a digital signal using the AD converter 314. The PUF-ID generation circuit 310 may generate a PUF-ID specific to the display device 100 using data (information) converted into the digital signal.

The power generation circuit 109 generates and supplies voltages for driving the scanning signal line driving circuit 108 and the driver IC 106. In addition, the power generation circuit 109 may generate a voltage for driving the pixel circuit 130 and directly supply the voltage to the pixel circuit 130. For example, the power generation circuit 109 generates the voltage Vrst, the voltage Vini, the first drive voltage VDDH1, the second drive voltage VDDH2, and the third drive voltage VDDH3. The first reset signal VL1 includes the voltage Vrst, and the second reset signal line VL2 includes the voltage *Vini*. The first reset signal VL1 is supplied to a first reset voltage line 415, the second reset signal VL2 is supplied to a second reset voltage line 414, the first drive voltage VDDH1 is supplied to the first drive power line PVDD1, the second drive voltage VDDH2 is supplied to the second drive power line PVDD2, and the third drive voltage VDDH3 is supplied to the third drive power line PVDD3.

For example, the read/write selection circuit 107 may supply the second reset signal line VL2 to the second reset voltage line 414 via the terminal 114 and the wiring 124, may supply the data-signal SL (m-5) to the data signal line 409A via the terminal 114 and the wiring 124, and may supply a first drive voltage terminal VDDH1 to the first drive power line PVDD1. For example, the power generation circuit 109 may supply the first reset signal VL1 to the scanning signal line driving circuit 108 via the terminal 118 and the wiring 126.

Further, the read/write selection circuit 107 may be arranged directly on the upper surface of the substrate 102, and the read-out control signals RCS and RCSA, the write control signals WCS and WCSA, and the image data signals WDS and WDSA may be supplied from the display device control circuit 320 to the terminal 114 or the terminal 118, and the read-out data signals RDS and RDSA may be supplied from the terminal 114 or the terminal 118 to the PUF-ID generation circuit 310 (see FIG. 7).

[1-4. Configuration of Pixel Circuit 130]

Figure 6:
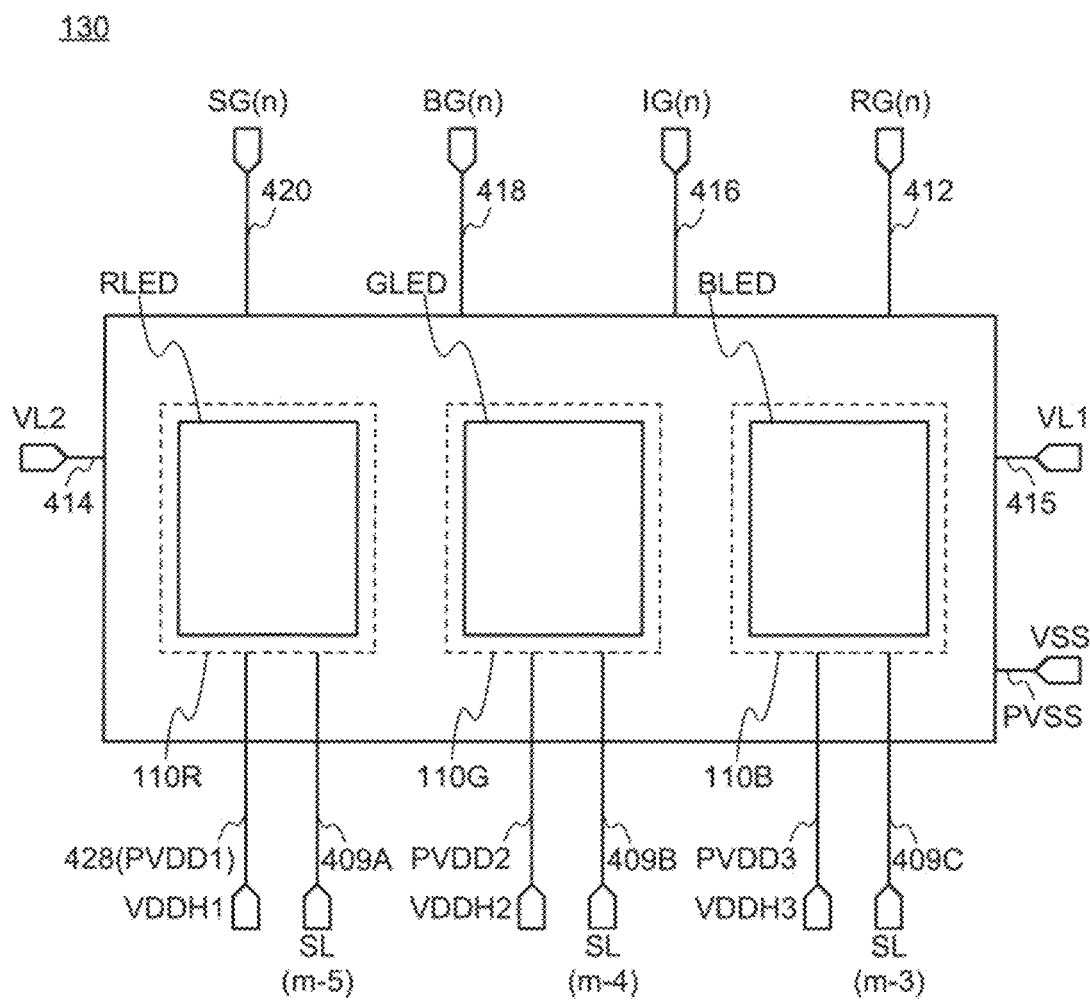
FIG. 6 is a schematic diagram showing a configuration of a pixel circuit according to an embodiment of the present invention.

FIG. 6 is a schematic diagram showing a configuration of the pixel circuit 130 according to an embodiment of the present invention. FIG. 7 is a circuit diagram showing a circuit configuration of the sub-pixel 120A according to an embodiment of the present invention. FIG. 6 and FIG. 7 show the configuration of the pixel circuit 130 of the pixel 120 in row n and column m shown in FIG. 4. The configuration of the pixel circuit 130 is not limited to the configuration shown in FIG. 6 and FIG. 7. Descriptions of the same or similar configurations as those in FIG. 1 to FIG. 5 will be omitted.

The pixel circuit 130 is a circuit for driving the pixel 120. As shown in FIG. 6, the pixel circuit 130 has light-emitting element driving units 110R, 110G, and 110B. The light-emitting element driving unit 110R is electrically connected to the light-emitting element RLED included in the sub-pixel 120A, the light-emitting element driving unit 110G is electrically connected to the light-emitting element GLED included in the sub-pixel 120B, and the light-emitting element driving unit 110B is electrically connected to the light-emitting element BLED included in the sub-pixel 120C.

The scanning signal SG (n), the light emission control signal BG (n), the initialization control signal IG (n), the reset signal RG (n), the first reset signal VL1, the second reset signal VL2, and the reference voltage VSS are supplied to each of the light-emitting element driving units 110R, 110G, and 110B. The first drive voltage VDDH1 and the data signal SL (m-5) are supplied to the light-emitting element driving unit 110R, the second drive voltage VDDH2 and a data signal SL (m-4) are supplied to the light-emitting element driving unit 110G, and the third drive voltage VDDH3 and a data signal SL (m-3 are supplied to the light-emitting element driving unit 110B. In the light-emitting element driving units 110R, 110G, and 110B, configurations except for the light-emitting element, the supplied drive voltage, and the data-signal SL are the same. Therefore, in the following explanation, a configuration related to the light-emitting element driving unit 110R will be mainly described.

The authentication device 10 can independently control currents supplied to the light-emitting element RLED, the light-emitting element GLED, and the light-emitting element BLED because the authentication device 10 can supply the drive voltage to each of the light-emitting element driving units 110R, 110G, and 110B independently. As a result, the display device 100 can cause each light-emitting element to emit light optimally, obtain the characteristics of each light-emitting element with high accuracy, and generate the PUF-ID specific to the display device 100 using the characteristics of each light-emitting element.

As shown in FIG. 7, the light-emitting element driving unit 110R includes a drive transistor DRT, a select transistor SST (first switch), an initialization transistor IST (second switch), a reset transistor RST (third switch), a light emission control transistor BCT (fourth switch), a capacitive element (first capacitive element) SC1, a capacitive element (second capacitive element) SC2, the light-emitting element RLED, an anode capacity Cad, and an additional capacity Cled. Each of these transistors includes a first electrode (gate electrode) and a pair of electrodes (source electrode, drain electrode) consisting of a second electrode and a third electrode. Each of the capacitive element SC1, the capacitive element SC2, the anode capacity Cad, and the additional capacity Cled has a pair of electrodes. In addition, the additional capacity Cled may be a parasitic capacitance of the light-emitting element RLED and include the capacitive element arranged parallel with the light-emitting element RLED and the parasitic capacitance of the light-emitting element RLED.

The first drive voltage VDDH1 is supplied from the first drive power line PVDD1, the reference voltage VSS is supplied from the reference voltage line PVSS, and the voltage Vrst is supplied from the reset signal VL1, as the power for driving the light-emitting element RLED. The voltage Vrst is smaller than the reference voltage VSS and the first drive voltage VDDH1.

The drive transistor DRT has a function of causing the light-emitting element RLED to emit light by using the input image data signal SL (m) to apply a current to the light-emitting element RLED. The select transistor SST has a function of supplying the image data signal SL (m) to the drive transistor DRT. In addition, the select transistor SST has a function of reading out the characteristics of the drive transistor DRT to the data signal line 409A. The initialization transistor IST has a function of resetting the drive transistor DRT by supplying the voltage Vini to a first gate electrode 620 and the like of the drive transistor DRT. The light emission control transistor BCT controls the connection and disconnection between the first drive power line PVDD1 and the drive transistor DRT. It can be said that the light emission control transistor BCT controls the electric connection and disconnection between the drive transistor DRT and the light-emitting element RLED and between the drive transistor DRT and the additional capacity Cled. That is, the light emission control transistor BCT has a function of controlling light emission and non-light emission of the light-emitting element RLED.

The reset transistor RST has a function of resetting a second electrode 610 (source electrode 610) of the drive transistor DRT, a first electrode 660 of the light-emitting element RLED, and a second electrode 650 of the capacitive element SC1 by supplying the voltage Vrst to the second electrode 610 (source electrode 610) of the drive transistor DRT, the first electrode 660 of the light-emitting element RLED, and the second electrode 650 of the capacitive element SC1. For example, the first electrode 660 of the light-emitting element RLED is an anode electrode.

The capacitive element SC1 has a function of holding a charge (a first charge) corresponding to a threshold voltage of the drive transistor DRT. In addition, the capacitive element SC1 has a function of holding a charge (a second charge) corresponding to image data input to the first electrode 620 (gate electrode 620) of the drive transistor DRT in order for the sub-pixel 120A to emit light. In other words, the capacitive element SC1 has a function of holding the input image data signal SL (m).

The capacitive element SC2 is a capacitance between the gate electrode 620 of the drive transistor DRT and the source electrode 610 of the drive transistor DRT, and is connected between the gate electrode 620 of the drive transistor DRT and the source electrode 610 of the drive transistor DRT.

The display device 100 includes a capacitive element such as the capacitive element SC1 for holding the image data signal SL (m), but it is not necessary that the element holding the image data signal SL (m) be a capacitive element. For example, an element capable of holding a signal or voltage may be the element capable of holding binary data such as an SRAM.

The light-emitting element RLED has diode characteristics. The additional capacity Cled is a capacitance included in the light-emitting element RLED. The anode capacity Cad is a capacitance formed between the first electrode 660 of the light-emitting element RLED and the first drive power line PVDD1. Further, in the display device 100, the image data signal SL (m) may be held by the additional capacity Cled and the capacitive element SC1 or the capacitive element SC2.

A gate electrode of the initialization transistor IST is electrically connected to an initialization control line 416. The initialization control signal IG (n) is supplied to the initialization control line 416. A conductive state and a non-conductive state of the initialization transistor IST are controlled by a signal supplied to the initialization control signal IG (n). The initialization transistor IST becomes non-conductive when the signal supplied to the initialization control signal IG (n) is at a low level (Low Level, L level). The initialization transistor IST becomes conductive when the signal supplied to the initialization control signal IG (n) is at a high level (High Level, H level). A source electrode of the initialization transistor IST is electrically connected to the second reset voltage line 414. The second reset signal VL2 is supplied to the second reset voltage line 414. A drain electrode of the initialization transistor IST is electrically connected to the gate electrode 620 of the drive transistor DRT, a drain electrode of the select transistor SST, and a first electrode 640 of the capacitive element SC1. The second electrode of the capacitive element SC1 is electrically connected to the source electrode 610 of the drive transistor DRT, a drain electrode of the reset transistor RST, the first electrode 660 of the light-emitting element RLED, and a first electrode of the additional capacity Cled.

A gate electrode of the select transistor SST is electrically connected to a scanning signal line 420. The scanning signal SG (n) is supplied to the scanning signal line 420. A conductive state and a non-conductive state of the select transistor SST are controlled by a signal supplied to the scanning signal SG (n). The select transistor SST becomes non-conductive when the signal supplied to the scanning signal SG (n) is at the L level. The select transistor SST becomes conductive when the signal supplied to the scanning signal SG (n) is at the H level. A source electrode of the select transistor SST is electrically connected to the data signal line 409. The image data signal SL (m) is supplied to the data signal line 409. In the first embodiment, the data signal line 409 is the data signal line 409A and the image data signal SL (m) is the image data signal SL (m-5).

A gate electrode of the light emission control transistor BCT is electrically connected to a light emission control line 418. The light emission control signal BG (n) is supplied to the light emission control line 418. A conductive state and a non-conductive state of the light emission control transistor BCT are controlled by a signal supplied to the light emission control signal BG (n). The light emission control transistor BCT becomes non-conductive when the signal supplied to the light emission control signal BG (n) is at the L level. The light emission control transistor BCT is conductive when the signal supplied to the light emission control signal BG (n) is at the H level. A drain electrode of the light emission control transistor BCT is electrically connected to the first drive power line PVDD1. The first drive power line PVDD1 is a drive power line 428. A source electrode of the light emission control transistor BCT is electrically connected to a drain electrode 630 of the drive transistor DRT.

A gate electrode of the reset transistor RST is electrically connected to a first reset signal line 412. The reset signal RG (n) is supplied to the first reset signal line 412. A conductive state and a non-conductive state of the reset transistor RST are controlled by a signal supplied to the reset signal RG (n). The reset transistor RST becomes non-conductive when the signal supplied to the reset signal RG (n) is at the L level. The reset transistor RST becomes conductive when the signal supplied to the reset signal RG (n) is at the H level. The first reset signal VL1 is supplied to a source electrode of the reset transistor RST.

A second electrode 670 of the light-emitting element RLED and a second electrode of the additional capacity Cled are electrically connected to the reference voltage line PVSS. For example, the reference voltage line PVSS is electrically connected to a cathode electrode.

The drain electrode of the initialization transistor IST, the drain electrode of the select transistor SST, the gate electrode 620 of the drive transistor DRT, the first electrode of the capacitive element SC2, and the first electrode of the capacitive element SC1 are electrically connected to a first node DRTG. The drain electrode of the reset transistor RST, the source electrode 610 of the drive transistor DRT, the second electrode of the capacitive element SC1, the second electrode of the capacitive element SC2, the first electrode 660 of the light-emitting element RLED, and the first electrode of the additional capacity Cled are electrically connected to a second node DRTS. The drain electrode 630 of the drive transistor DRT and the source electrode of the light emission control transistor BCT are electrically connected to a third node DRTD.

Since the first reset signal line 412 of the display device 100 supplies the common voltage Vrst to each pixel, the first reset signal line 412 of the display device 100 may be referred to as a first common electrode. Since the second reset voltage line 414 of the display device 100 supplies the common voltage Vini to each pixel, the second reset voltage line 414 of the display device 100 may be referred to as a second common electrode.

In the display device 100, it is assumed that the conductive state indicates a state in which the source electrode and the drain electrode of the transistor are conductive and the transistor is in an on (ON) state, and the non-conductive state indicates a state in which the source electrode and the drain electrode of the transistor are non-conductive and the transistor is in an off (OFF) state. In addition, in each transistor, the source electrode and the drain electrode may be interchanged depending on a voltage or a potential supplied to each electrode. Further, those skilled in the art will readily appreciate that even when the transistor is in the off state, a slight current flows, such as a leakage current.

Each transistor shown in FIG. 7 may have Group 14 elements, such as silicon or germanium, or an oxide exhibiting semiconductor properties in a channel area. For example, the channel area of the transistor has low-temperature polysilicon (LTPS). In the display device 100, each transistor is formed using a thin film transistor (TFT) and has an n-channel field effect transistor. Each transistor may have the n-channel field effect transistor and a p-channel field effect transistor, and may have only the p-channel field effect transistor. For the display device 100, the configuration of the transistor, the connection of the storage capacitor, the source voltage, and the like may be appropriately adapted according to the application and specifications.

Part of the transistors may be shared between adjacent pixels. For example, one reset transistor RST may be provided in the scanning signal line driving circuit 108 for each row. One reset transistor RST may be provided in the scanning signal line driver circuit 108 for a plurality of rows. One reset transistor RST may be provided in the peripheral portion 116 for each row. One reset transistor RST may be provided in the peripheral portion 116 for a plurality of rows.

[1-5. Driving Method for Displaying Image on Authentication Device 10]

Figure 8:
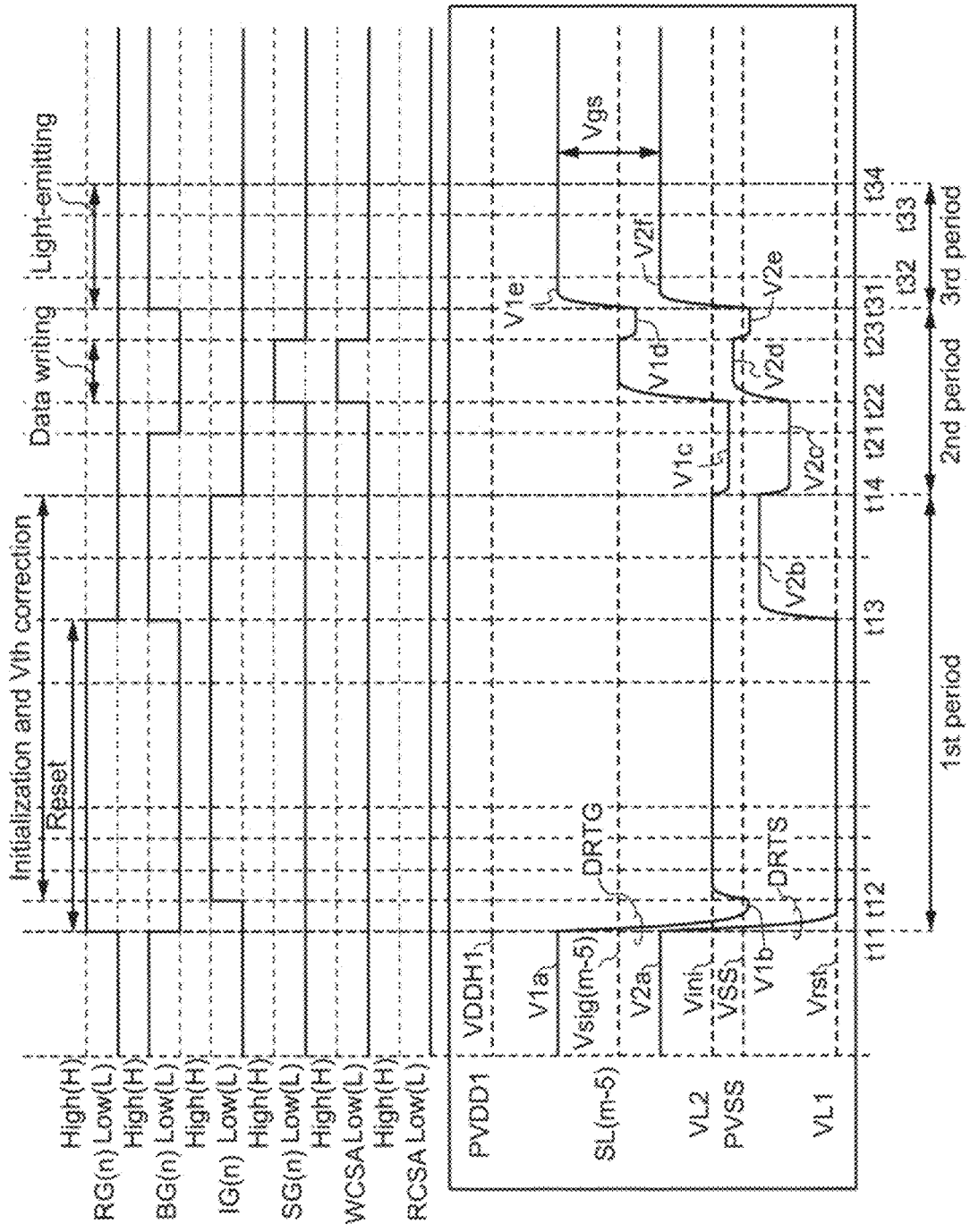
FIG. 8 is a schematic diagram showing a timing chart of an authentication device according to an embodiment of the present invention.
Figure 9:
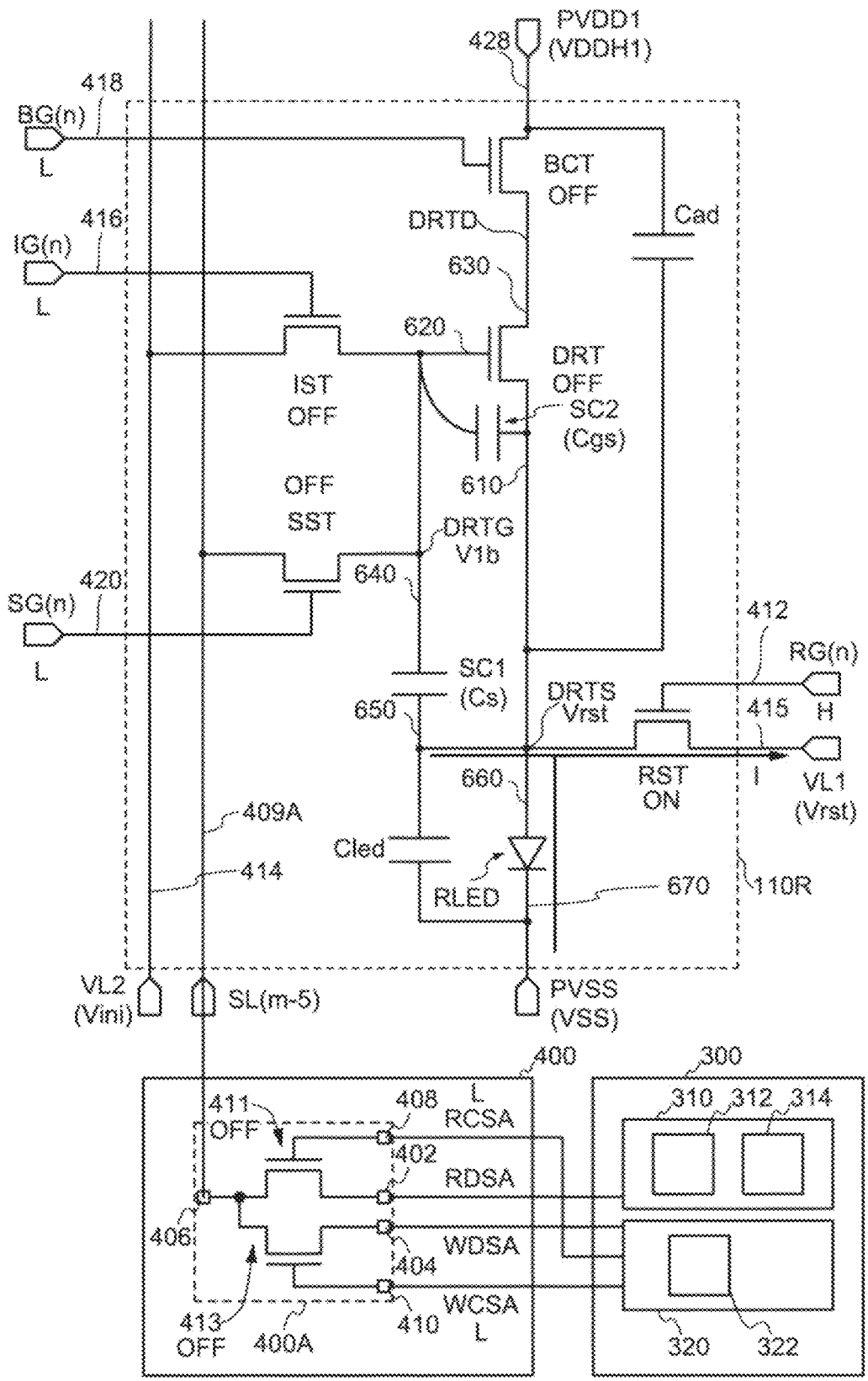
FIG. 9 is a schematic diagram showing a pixel circuit and a read/write selection circuit in a first period shown in FIG. 7 and a fourth period shown in FIG. 16.
Figure 10:
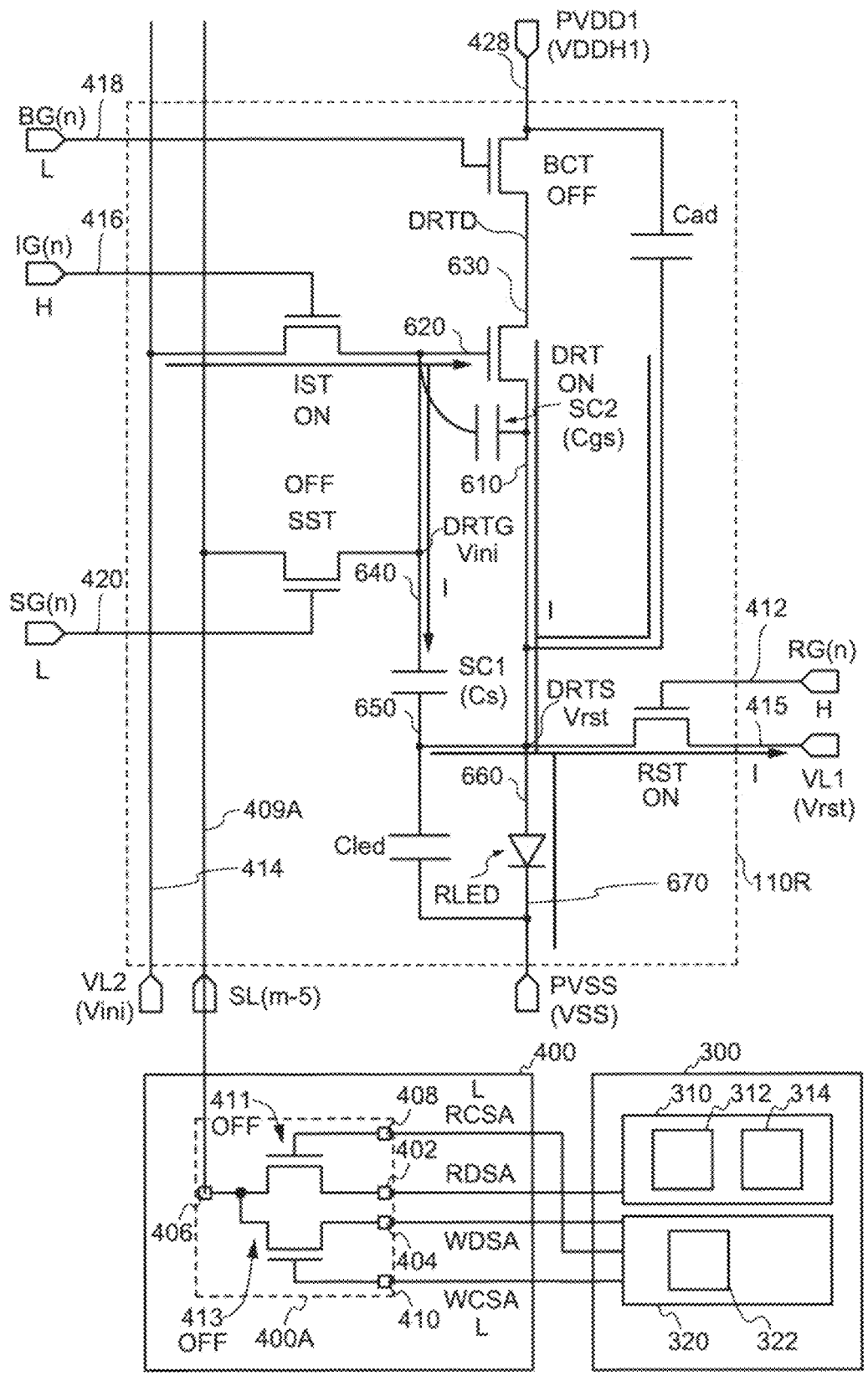
FIG. 10 is a schematic diagram showing a pixel circuit and a read/write selection circuit in the first period shown in FIG. 7 and the fourth period shown in FIG. 16.
Figure 11:
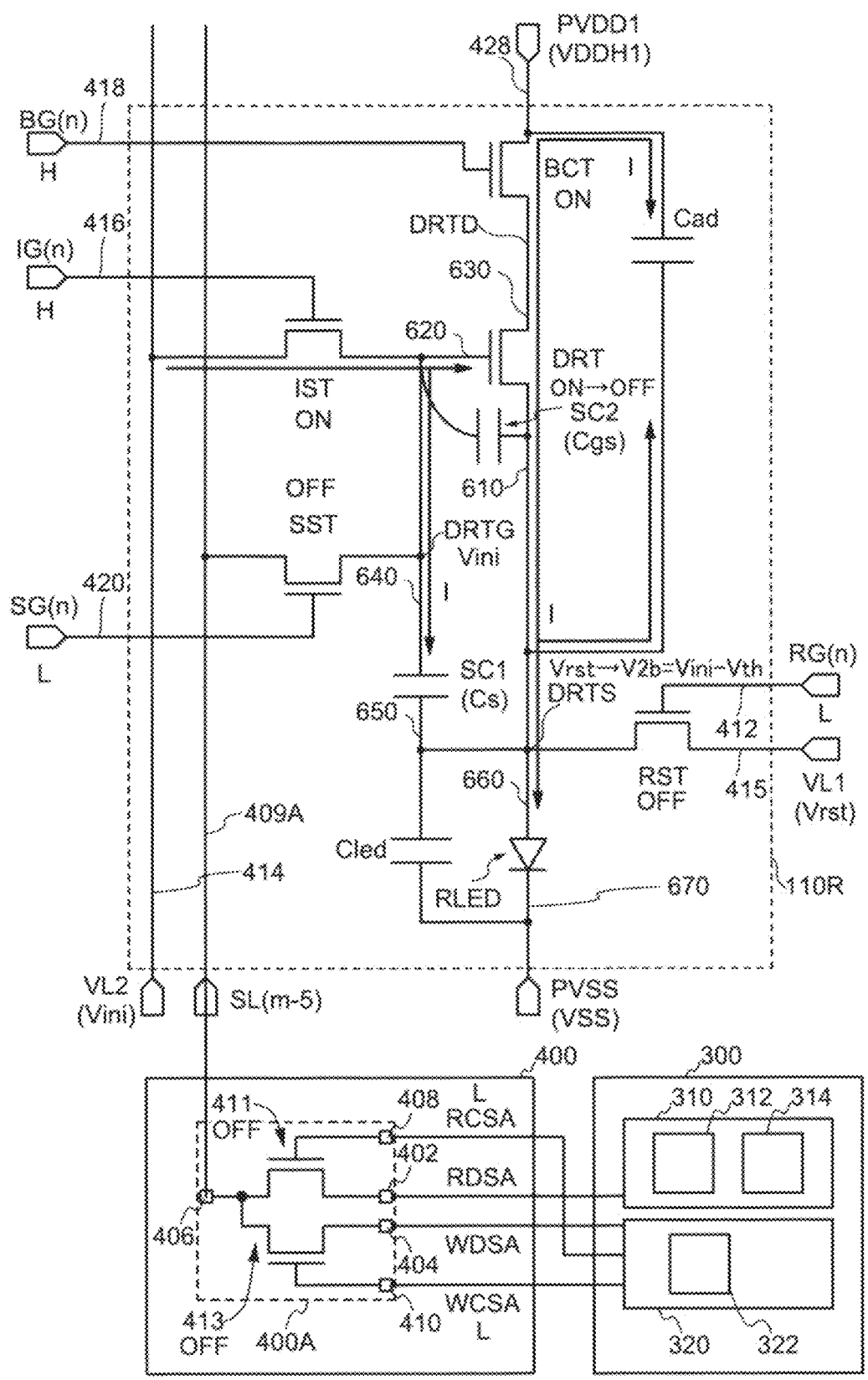
FIG. 11 is a schematic diagram showing a pixel circuit and a read/write selection circuit in the first period shown in FIG. 7 and the fourth period shown in FIG. 16.
Figure 12:
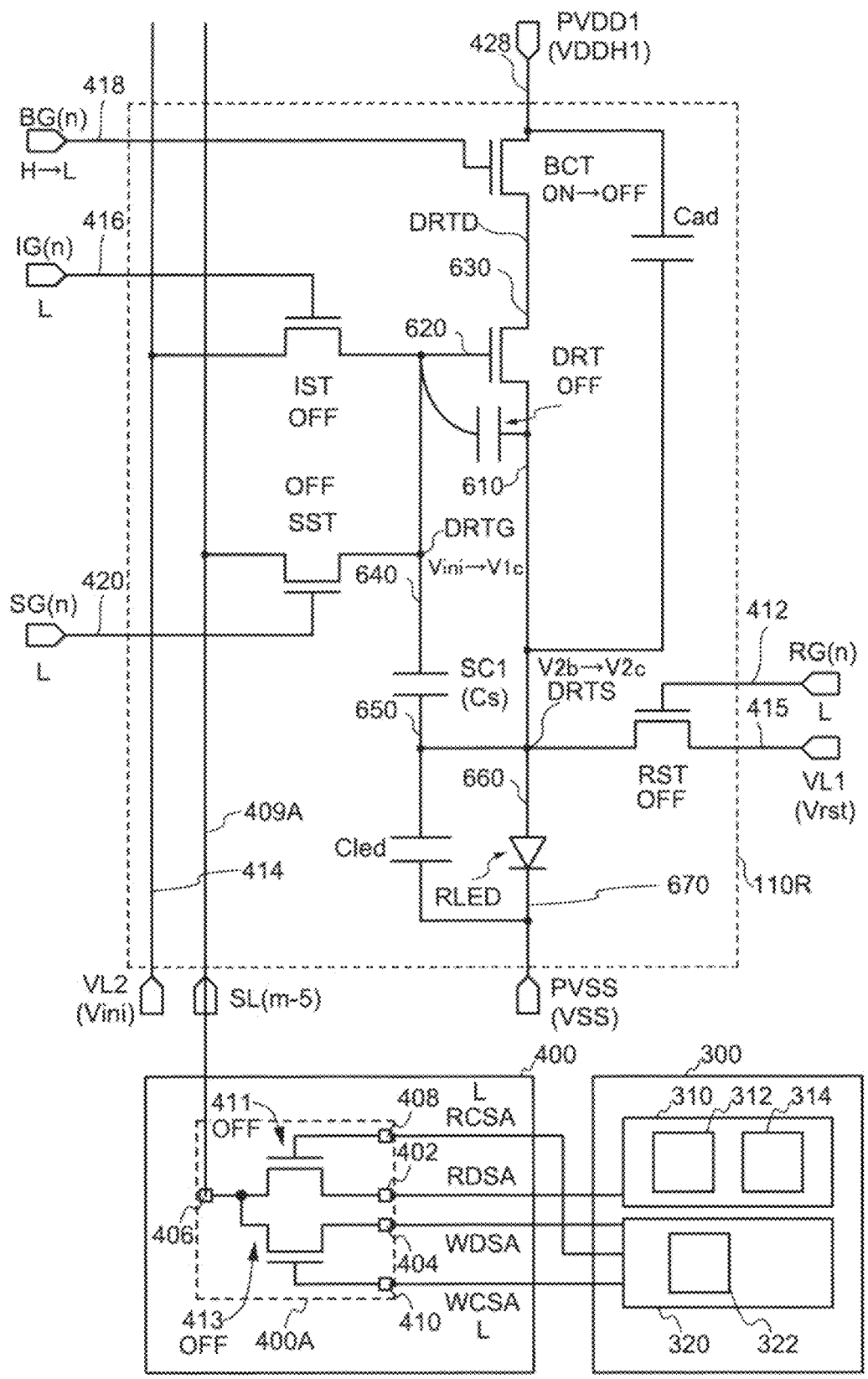
FIG. 12 is a schematic diagram showing a pixel circuit and a read/write selection circuit in a second period shown in FIG. 7 and a fifth period shown in FIG. 16.
Figure 13:
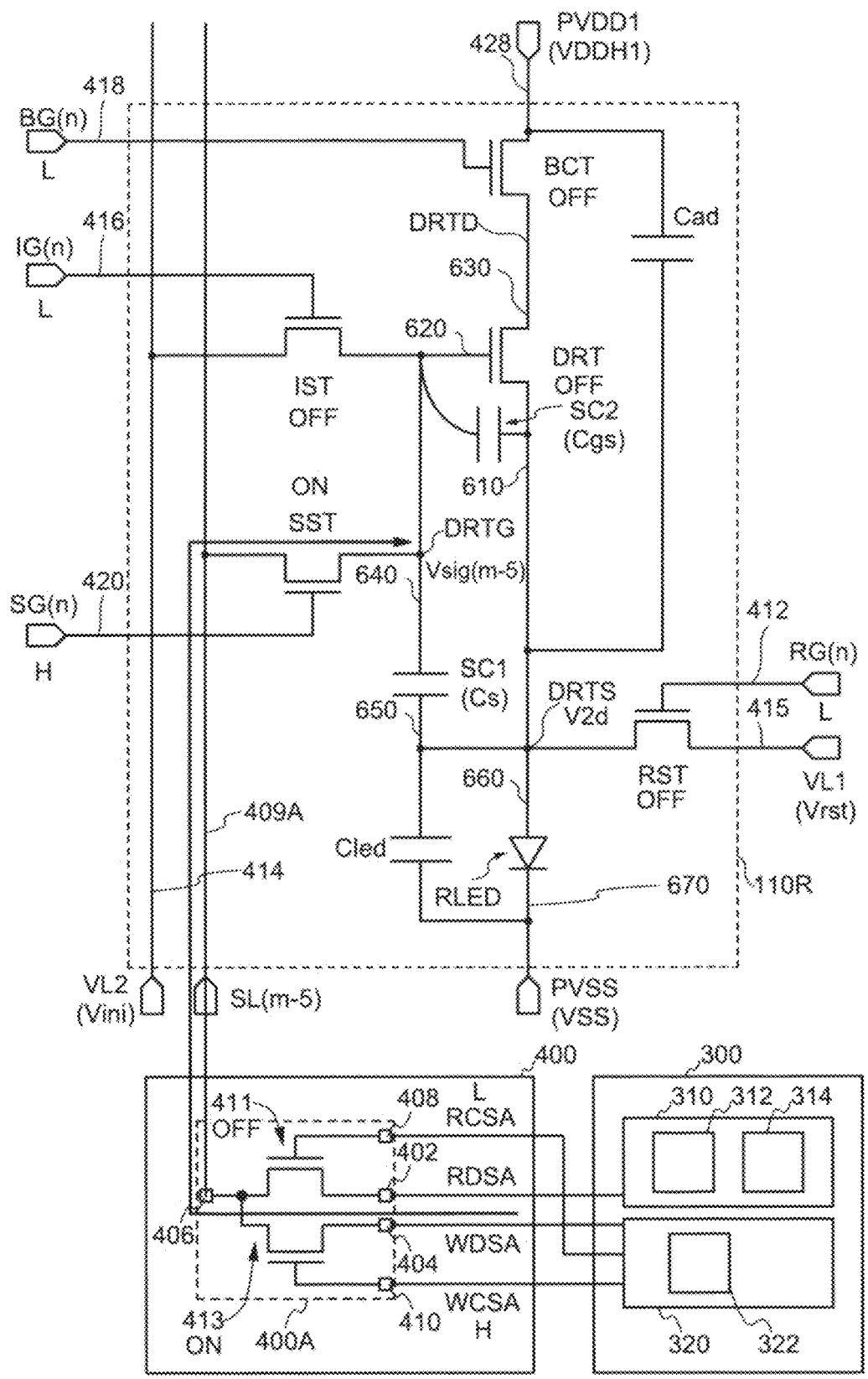
FIG. 13 is a schematic diagram showing a pixel circuit and a read/write selection circuit in the second period shown in FIG. 7 and the fifth period shown in FIG. 16.
Figure 14:
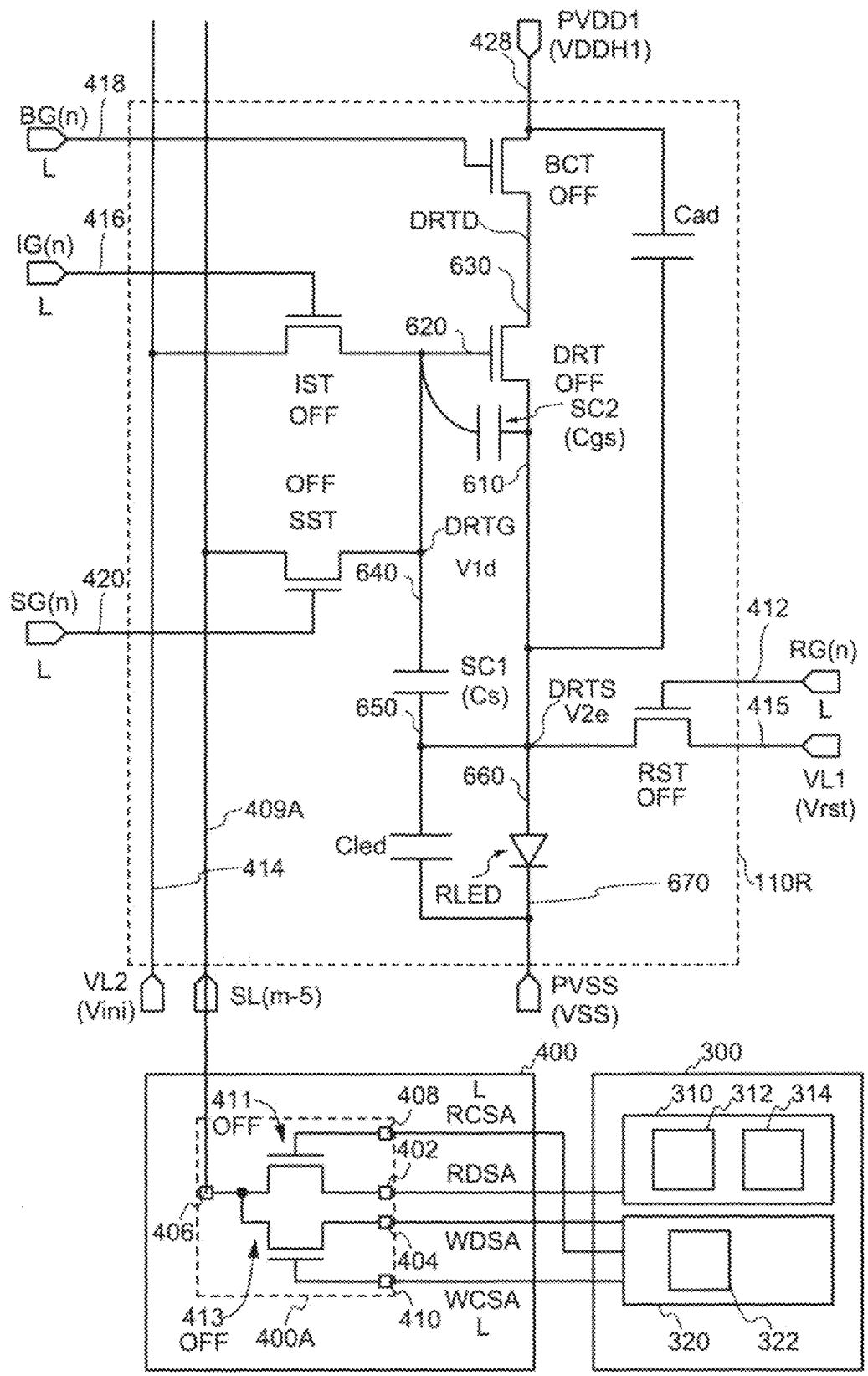
FIG. 14 is a schematic diagram showing a pixel circuit and a read/write selection circuit in the second period shown in FIG. 7 and the fifth period shown in FIG. 16.
Figure 15:
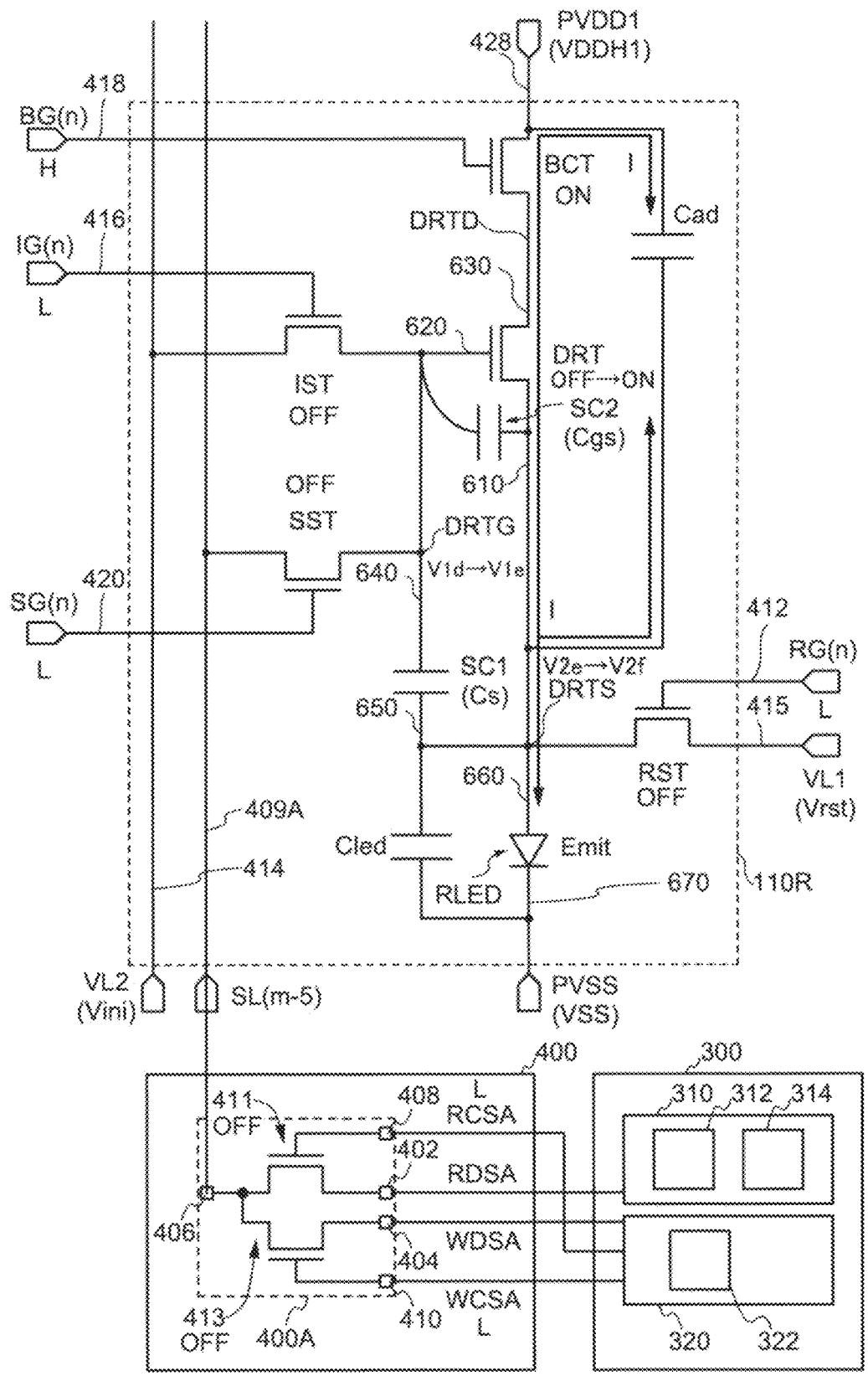
FIG. 15 is a schematic diagram showing a pixel circuit and a read/write selection circuit in a third period shown in FIG. 7 and a sixth period shown in FIG. 16.

FIG. 8 is a schematic diagram showing a timing chart for displaying an image on the authentication device 10 according to an embodiment of the present invention. FIG. 9 to FIG. 11 are schematic diagrams showing the pixel circuit 130 and the read/write selection circuit 107 in a first period shown in FIG. 7. FIG. 12 to FIG. 14 are schematic diagrams showing the pixel circuit 130 and the read/write selection circuit 107 in a second period shown in FIG. 7. FIG. 15 is a schematic diagram showing the pixel circuit 130 and the read/write selection circuit 107 in a third period shown in FIG. 7. The driving method of the authentication device 10 is not limited to the driving method illustrated in FIG. 8 to FIG. 15. Descriptions of the same or similar configurations as those in FIG. 1 to FIG. 7 will be omitted.

In this case, the driving method of the authentication device 10 for driving the plurality of pixels 120 electrically connected to the scanning signal line 420 in the n-th row will be described. As shown in FIG. 8, the driving method for displaying an image on the authentication device 10 includes the first period, the second period, and the third period. The first period includes a reset operation, an initialization operation, and a threshold correction operation, the second period includes a data write operation, and the third period includes a light-emitting operation. FIG. 8 shows a timing diagram for driving the plurality of pixel circuits 130 electrically connected to the scanning signal line 420 in the n-th row as an example. FIG. 9 to FIG. 15 show an operation state of the light-emitting element driving unit 110R and a read/write selection circuit 107A of the sub-pixel 120A in the n-th row and m-th column. The authentication device 10 repeatedly executes the driving method shown in FIG. 8 from the plurality of pixel circuits 130 in the first row to the plurality of pixel circuits 130 in the last row. As a result, the authentication device 10 can display an image on the display device 100. In addition, in the timing chart for displaying the image shown in FIG. 8, as an example, in all periods, a low level is supplied to the read-out control signal RCSA, the first drive voltage VDDH1 is supplied to the first drive power line PVDD1, a voltage Vsig (m-5) is supplied to the data signal SL (m-5), the voltage Vini is supplied to the second reset signal VL2, and the voltage Vrst is supplied to the first reset signal VL1.

[1-5-1. Reset Operation for First Period]

The reset operation is an operation that sets the sub-pixel 120A to a reset state by resetting the first node DRTG and the second node DRTS of the light-emitting element driving unit 110R. From a time t11 to a time t13, the authentication device 10 executes the reset operation.

Timings of various signals from the time t11 to the time t12 will be described with reference to FIG. 8 or FIG. 9. As shown in FIG. 8, from the time t11 to the time t12, the reset signal RG (n) changes from a low level to a high level, and the high level is supplied to the reset signal RG (n). The light emission control signal BG (n) changes from a high level to a low level, and the low level is supplied to the light emission control signal BG (n). The low level is supplied to the initialization control signal IG (n), the scanning signal SG (n), and the write control signal WCSA. Therefore, as shown in FIG. 9, the initialization transistors IST, the select transistor SST, the light emission control transistor BCT, the first transistor 411, and the second transistor 413 are in the non-conductive state (OFF). On the other hand, the reset transistor RST is in the conductive state (ON). In addition, the drive transistor DRT is assumed to be in the non-conductive state (OFF) but may be in the conductive state (ON). In the reset operation, the current from the first drive power line PVDD1 to the first electrode 660 of the light-emitting element RLED is interrupted by the light emission control transistor BCT.

As a result, as shown in FIG. 8 or 9, the light-emitting element RLED becomes non-light-emitting, and the charges remaining in the third node DRTD, the second node DRTS, and the like are extracted through the drive transistor DRT and the reset transistor RST, and the voltage of the source electrode 610 (the second node DRTS) of the drive transistor DRT decreases from the voltage V2a to the voltage Vrst and fixed to the voltage Vrst. A voltage of the gate electrode 620 (the first node DRTG, the first electrode 640 of the capacitive element SC1) of the drive transistor DRT decreases from a voltage V1a of the data signal written in the previous frame to a voltage V1b and fixed to the voltage V1b.

The voltage V1a is smaller than the first drive voltage VDDH1 and larger than the voltage Vsig (m-5), and the voltage V2a is smaller than the voltage Vsig (m-5) and larger than the voltage Vini. The voltage Vini is smaller than the voltage V2a and larger than the reference voltage VSS, and the voltage V1b is smaller than the reference voltage VSS and larger than the voltage Vrst.

Timings of various signals from the time t12 to the time t13 will be described with reference to FIG. 8 or FIG. 10. As shown in FIG. 8, from the time t12 to the time t13, the reset signal RG (n) is maintained at a high level, and the light emission control signal BG (n), the scanning signal SG (n), and the write control signal WCSA are maintained at a low level. The initialization control signal IG (n) changes from the low level to the high level, and the high level is supplied to the initialization control signal IG (n). Therefore, as shown in FIG. 10, the select transistor SST, the light emission control transistor BCT, the first transistor 411, and the second transistor 413 are in the non-conductive state (OFF). On the other hand, the initialization transistor IST, the drive transistor DRT, and the reset transistor RST are in the conductive state (ON).

As shown in FIG. 8 or FIG. 10, from the time t12 to the time t13, the current from the first drive power line PVDD1 to the first electrode 660 of the light-emitting element RLED is interrupted by the light emission control transistor BCT, and the source electrode 610 (the second node DRTS) of the drive transistor DRT is fixed to the voltage Vrst. In addition, the voltage of the gate electrode 620 (the first node DRTG, and the first electrode 640 of the capacitive element SC1) of the drive transistor DRT increases from the voltage V1b to the voltage Vini via the initialization transistor IST and is fixed to the voltage Vini. That is, the source electrode 610 (the second node DRTS) of the drive transistor DRT and the gate electrode 620 (the first node DRTG) of the drive transistor DRT are reset (initialized).

[1-5-2. Initialization Operation and Threshold Correction Operation for First Period]

The initialization operation and the threshold correction operation are operations that cause the capacitive element SC1 connected between the first node DRTG and the second node DRTS to hold charges corresponding to the threshold voltage Vth of the drive transistor DRT by initializing the first node DRTG and the second node DRTS of the light-emitting element driving unit 110R. From the time t12 to a time t14, the authentication device 10 executes the initialization operation and the threshold correction operation. Since the initialization operation and the threshold correction operation from the time t11 to the time t13 are the same as those in the reset operation, the explanation thereof will be omitted. The authentication device 10 executes the initialization operation and the threshold correction operation.

Timings of various signal from the time t13 to the time t14 will be described with reference to FIG. 8 or FIG. 11. As shown in FIG. 8, from the time t13 to the time t14, the reset signal RG (n) changes from a high level to a low level, and the low level is supplied to the reset signal RG (n). The light emission control signal BG (n) changes from a low level to a high level, and the high level is supplied to the light emission control signal BG (n). The initialization control signal IG (n) is maintained at the high level and the scan SG (n) and the write control signal WCSA are maintained at the low level. Therefore, as shown in FIG. 11, the select transistor SST, the reset transistor RST, the first transistor 411, and the second transistor 413 are in the non-conductive state (OFF). On the other hand, the light emission control transistor BCT and the initialization transistor IST are in the conductive state (ON). Further, the drive transistor DRT changes from the conductive state (ON) to the non-conductive state (OFF) according to the voltages supplied to the first node DRTG, the second node DRTS, and the third node DRTD.

In the initialization operation and the threshold correction operation, the light emission control transistor BCT is electrically connected to the first drive power line PVDD1 (the drive power line 428), and the first drive voltage VDDH1 is supplied to the third electrode 630 (the third node DRTD) of the drive transistor DRT. As a result, a current flows through the drive transistor DRT from the first drive power line PVDD1 toward the first electrode 660 of the light-emitting element RLED (the drive transistor DRT is in the conductive state). Therefore, the source electrode 610 of the drive transistor DRT and the second electrode 650 (i.e., the second node DRTS) of the capacitive element SC1 are charged.

In addition, the voltage of the gate electrode 620 (the first node DRTG) of the drive transistor DRT is fixed to the voltage Vini. The voltage of the source electrode 610 (the second node DRTS) of the drive transistor DRT increases from the voltage Vrst to the voltage V2$b$. In this case, the voltage V2$b$ is Vini−Vth and is larger than the voltage Vrst and smaller than the reference voltage VSS. Since the voltage between the gate electrode 620 and the source electrode 610 of the drive transistor DRT becomes the threshold voltage Vth when the voltage of the source electrode 610 (the second node DRTS) of the drive transistor DRT becomes the voltage V2$b$ (=Vini−Vth), the drive transistor DRT becomes non-conductive.

The authentication device 10 (the display device 100) can hold charges corresponding to the threshold voltage Vth of the drive transistor DRT between the first node DRTG and the second node DRTS (the capacitive element SC1) by the initialization operation and the threshold correction operation. As a result, the authentication device 10 (the display device 100) can correct the threshold voltage of the drive transistor DRT. In addition, in this case, a voltage {(Vini−Vth)−PVSS} is supplied between the first electrode 660 and the second electrode 670 of the light-emitting element RLED. However, since this voltage does not exceed an emission start voltage of the light-emitting element RLED, no current flows through the light-emitting element RLED. Therefore, the light-emitting element RLED is in the non-light-emitting state.

[1-5-3. Data Write Operation in Second Period]

The data write operation is an operation that supplies (writes) image data to the first node DRTG of the light-emitting element driving unit 110R and allows the light-emitting element RLED to emit light using a voltage corresponding to the image data. The second period is the time t14 to a time t31, and the authentication device 10 executes the data write operation from the time t22 to the time t23.

Timings of various signals from the time t14 to a time t22 will be described with reference to FIG. 8 or FIG. 12. As shown in FIG. 8, from the time t14 to the time t22, the initialization control signal IG (n) changes from a high level to a low level, and the low level is supplied to the initialization control signal IG (n). The reset signal RG (n), the scanning signal SG (n), and the write control signal WCSA are maintained at the low level. In addition, the light emission control signal BG (n) changes from a high level to a low level at the time t21, and the low level is supplied to the light emission control signal BG (n). Therefore, as shown in FIG. 12, the initialization transistor IST, the select transistor SST, the drive transistor DRT, the reset transistor RST, the first transistor 411, and the second transistor 413 are in the non-conductive state (OFF). On the other hand, the light emission control transistor BCT changes from the conductive state (ON) to the non-conductive state (OFF).

In response to each transistor becoming non-conductive, the voltage of the gate electrode 620 (the first node DRTG) of the drive transistor DRT decreases from the voltage Vini to a voltage V1$c$ due to the capacitive coupling of the capacitive element SC1 and the capacitive element SC2 and is fixed to the voltage V1$c$. In addition, the voltage of the source electrode 610 (the second node DRTS) of the drive transistor DRT decreases from the voltage V2$b$ to a voltage V2$c$ and is fixed to the voltage V2$c$. The voltage (V1$c$−V2$c$) is the same as or substantially the same as the voltage (Vini−Vth), and charges corresponding to the threshold voltage Vth of the drive transistor DRT are held between the first node DRTG and the second node DRTS (the capacitive element SC1). In addition, the voltage V1$c$ is larger than the reference voltage VSS and smaller than the voltage Vini, and the voltage V2$c$ is smaller than the reference voltage VSS and larger than the voltage Vrst.

Timings of various signals from the time t22 to the time t23 will be described with reference to FIG. 8 or FIG. 13. From the time t22 to the time t23, the authentication device 10 (the display device 100) executes the data write operation. As shown in FIG. 8, the scanning signal SG (n) and the write control signal WCSA change from a low level to a high level, and the high level is supplied to the scanning signal SG (n) and the write control signal WCSA. The reset signal RG (n), the light emission control signal BG (n), and the initialization control signal IG (n) are maintained at the low level.

Therefore, as shown in FIG. 13, the light emission control transistor BCT, the initialization transistor IST, the drive transistor DRT, the reset transistor RST, and the first transistor 411 are in the non-conductive state (OFF). On the other hand, the select transistor SST and the second transistor 413 change from the non-conductive state (OFF) to the conductive state (ON). The display device control circuit 320 supplies the image data signal WDSA to the write terminal 404 when the select transistor SST and the second transistor 413 become conductive. The image data signal WDSA is transmitted to the gate electrode 620 (the first node DRTG) of the drive transistor DRT via the write terminal 404, the second transistor 413, the data signal line connection terminal 406, the data signal line 409A, and the select transistor SST.

In this case, the image data signal WDSA is the data signal SL (m-5). The data signal SL (m-5) contains the voltage Vsig (m-5), and the voltage of the gate electrode 620 (the first node DRTG) of the drive transistor DRT increases from the voltage V1$c$ to the voltage Vsig (m-5) and is fixed to the voltage Vsig (m-5). On the other hand, the voltage of the source electrode 610 (the second node DRTS) of the drive transistor DRT increases from the voltage V2$c$ to a voltage V2$d$, and is fixed to the voltage V2$d$. In this case, a voltage between the first node DRTG and the second node DRTS changes from V1$c$−V2$c$ to Vsig (m-5)−V2$d$. For example, since the voltage (V1$c$−V2$c$) is the same as or substantially the same as the voltage (Vini−Vth), the voltage between the first node DRTG and the second node DRTS is {Vsig (m-5)−(Vini−Vth)}. Therefore, the voltage between the first node DRTG and the second node DRTS is a voltage reflecting the variation in the threshold voltage of the drive transistor DRT. In addition, the voltage V2d is larger than the reference voltage VSS and smaller than the voltage Vini.

Timings of various signals from the time t23 to the time t31 will be described with reference to FIG. 8 or FIG. 14. As shown in FIG. 8, from the time t23 to the time t31, the scanning signal SG (n) and the write control signal WCSA change from a high level to a low level, and the low level is supplied to the scanning signal SG (n) and the write control signal WCSA. In addition, the reset signal RG (n), the light emission control signal BG (n), and the initialization control signal IG (n) are maintained at the low level. Therefore, as shown in FIG. 14, the light emission control transistor BCT, the initialization transistor IST, the drive transistor DRT, the reset transistor RST, and the second transistor 413 are in the non-conductive state (OFF). On the other hand, the select transistor SST and the second transistor 413 change from the conductive state (ON) to the non-conductive state (OFF).

All the transistors become non-conductive when the select transistor SST and the second transistor 413 become non-conductive. In response to each transistor becoming non-conductive, the voltage of the gate electrode 620 (the first node DRTG) of the drive transistor DRT decreases from the voltage Vsig (m-5) to the voltage V1d due to the capacitive coupling of the capacitive element SC1 and the capacitive element SC2 and is fixed to the voltage V1d. In addition, the voltage of the source electrode 610 (the second node DRTS) of the drive transistor DRT decreases from the voltage V2d to a voltage V2e and is fixed to the voltage V2e. Further, the voltage V1d is larger than the voltage Vini and smaller than the voltage Vsig (m-5), and the voltage V2e is smaller than the reference voltage VSS and larger than the voltage Vrst.

At the time t31, the voltage between the first node DRTG and the second node DRTS changes from Vsig (m-5)–V2d to V1d–V2e. For example, the voltage between the first node DRTG and the second node DRTS are maintained at {Vsig (m-5)–(Vini–Vth)}.

[1-5-4. Light-Emitting Operation in Third Period]

The light-emitting operation is an operation in which the light-emitting element RLED emits light using a voltage corresponding to the image data, that is, an operation in which the authentication device 10 (the display device 100) displays an image on the display unit 104. The third period is the time t31 to the time t34.

Timings of various signals from the time t31 to the time t34 will be described with reference to FIG. 8 or FIG. 15. As shown in FIG. 8, from the time t31 to the time t34, the light emission control signal BG (n) changes from a low level to a high level, and the high level is supplied to the light emission control signal BG (n). In addition, the reset signal RG (n), the initialization control signal IG (n), the scanning signal SG (n), and the write control signal WCSA are maintained at the low level. Therefore, as shown in FIG. 15, the initialization transistor IST and the select transistor SST, the reset transistor RST, the first transistor 411, and the second transistor 413 are in the non-conductive state (OFF). On the other hand, the light emission control transistor BCT changes from the non-conductive state (OFF) to the conductive state (ON).

As shown in FIG. 8 or FIG. 15, as the light emission control transistor BCT becomes conductive (ON), the light emission control transistor BCT is electrically connected to the first drive power line PVDD1 (the drive power line 428), and the first drive voltage VDDH1 is supplied to the third electrode 630 (the third node DRTD) of the drive transistor DRT. As a result, the voltage of the source electrode 610 (the second node DRTS) of the drive transistor DRT increases from the voltage V2e to a voltage V2f and is fixed to the voltage V2f. In addition, as the voltage of the source electrode 610 (the second node DRTS) of the drive transistor DRT increases to the voltage V2f, the voltage of the gate electrode 620 (the first node DRTG) of the drive transistor DRT increases from the voltage V1d to the voltage V1e due to the capacitive coupling of the capacitive element SC1 and the capacitive element SC2 and is fixed to the voltage V1e.

A current flows through the drive transistor DRT from the first drive power line PVDD1 toward the first electrode 660 of the light-emitting element RLED (the drive transistor DRT is in the conductive state). Therefore, the source electrode 610 of the drive transistor DRT and the second electrode 650 (i.e., the second node DRTS) of the capacitive element SC1 are charged. The voltage between the first node DRTG and the second node DRTS changes from V1d–V2e to V1e–V2f. For example, the voltage (V1e–V2f) is the same or substantially the same as the voltage (V1d–V2e), and the voltage between the first node DRTG and the second node DRTS are maintained at {Vsig (m-5)–(Vini–Vth)}. The voltage between the first node DRTG and the second node DRTS is a voltage Vgs between the gate electrode 620 and the source electrode 610 of the drive transistor DRT. The voltage Vgs is a voltage obtained by correcting the threshold voltage Vth of the drive transistor DRT.

The current flowing through the drive transistor DRT flows to the light-emitting element RLED using the voltage Vsig (m-5) of the image data and the voltage Vgs corresponding to the corrected threshold voltage, and the light-emitting element RLED emits light (Emit).

For example, in this case, the voltage V1e of the gate electrode 620 of the drive transistor DRT (that is, the voltage of the first node DRTG) is Vsig (m-5)–(Vini–Vth)+Vled. In this case, the voltage Vled is a voltage between the first electrode 660 and the second electrode 670 of the light-emitting element RLED, a capacitance value Cs is a capacitance value of the capacitive element SC1, a capacitance value Cled is a capacitance value of the additional capacity Cled, and a capacitance value Cad is a capacitance value of the anode capacity Cad.

As described above, a series of operations of the light-emitting element driving unit 110R of the sub-pixel 120A is completed. Similar to the light-emitting element driving unit 110R, the operation of the light-emitting element driving unit 110G of the sub-pixel 120B and the operation of the light-emitting element driving unit 110B of the sub-pixel 120C are also completed. One subframe period (e.g., a first subframe period) operation is completed when the operation is completed from each sub-pixel in the first row to the sub-pixel in the last row of the scanning signal line. The same operation is repeatedly executed in a plurality of subframe periods (e.g., a second subframe period, a third subframe period, . . . ), thereby a one-screen image is obtained within one frame period. An image is displayed on the display unit 104 of the display device 100 by repeating the operation.

[1-6. Driving Method for Generating PUF-ID of Authentication Device 10]

Figure 16:
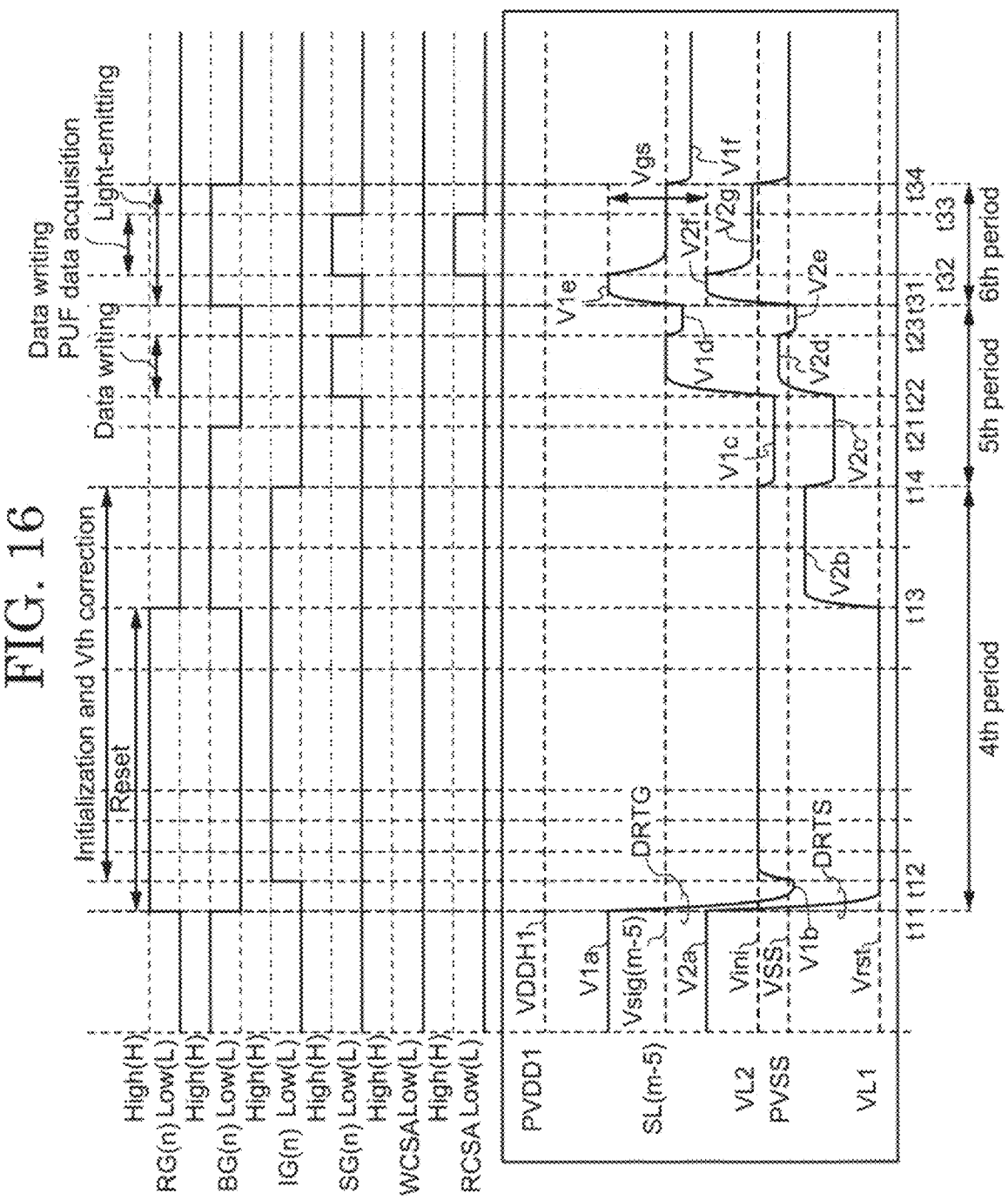
FIG. 16 is a schematic diagram showing a timing chart of an authentication device according to an embodiment of the present invention.
Figure 17:
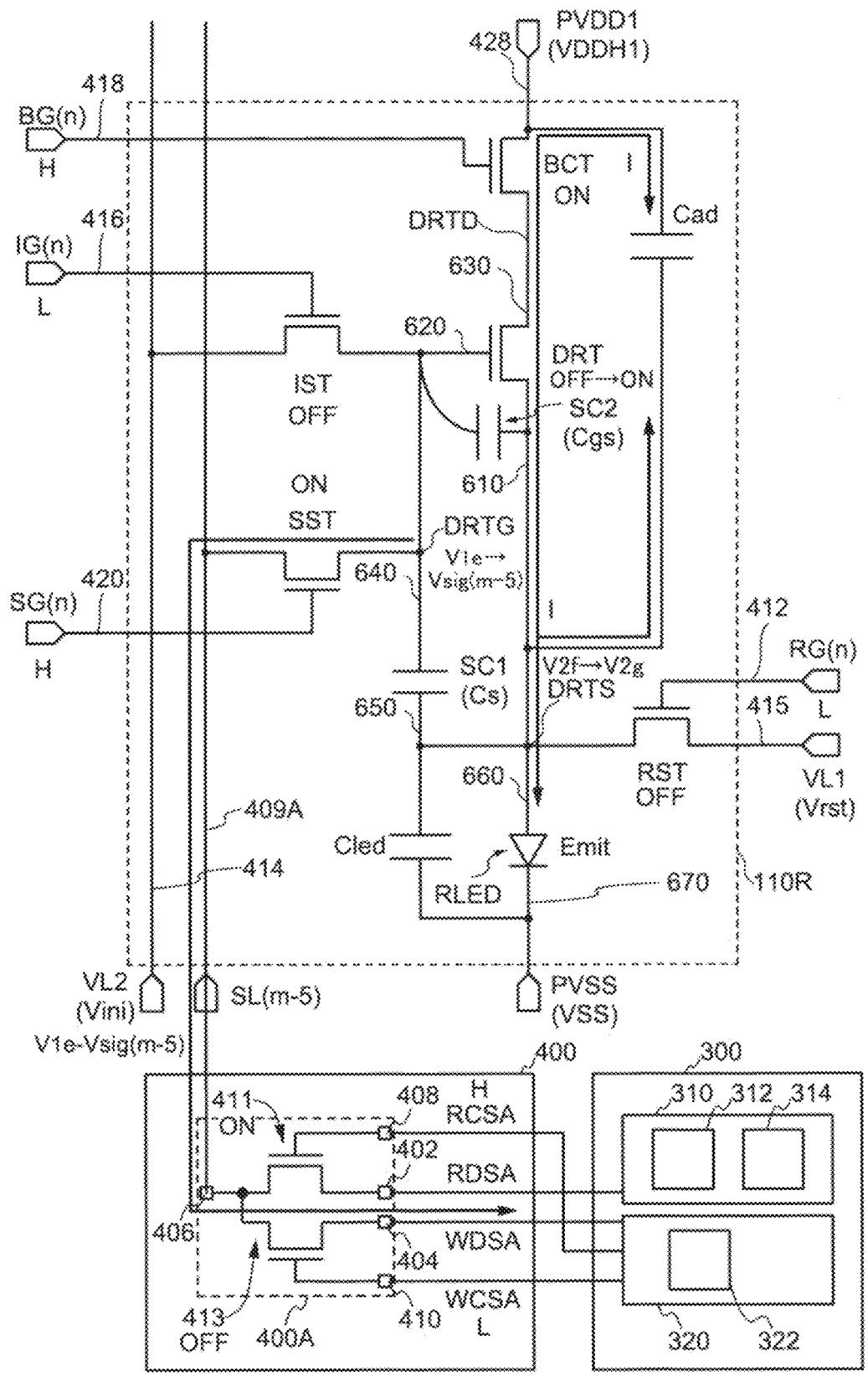
FIG. 17 is a schematic diagram showing a pixel circuit and a read/write selection circuit in the sixth period shown in FIG. 16.
Figure 18:
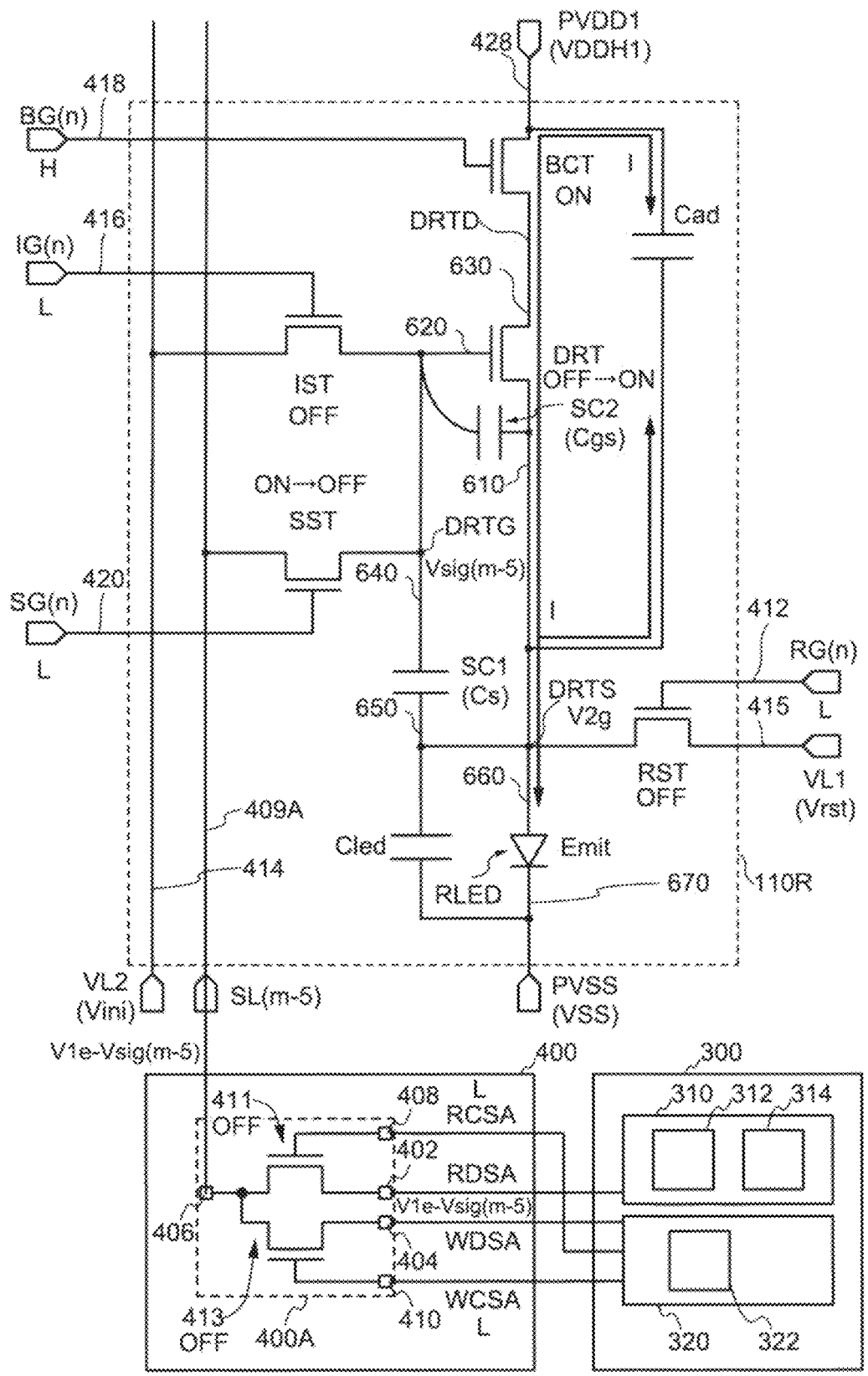
FIG. 18 is a schematic diagram showing a pixel circuit and a read/write selection circuit in the sixth period shown in FIG. 16.
Figure 19:
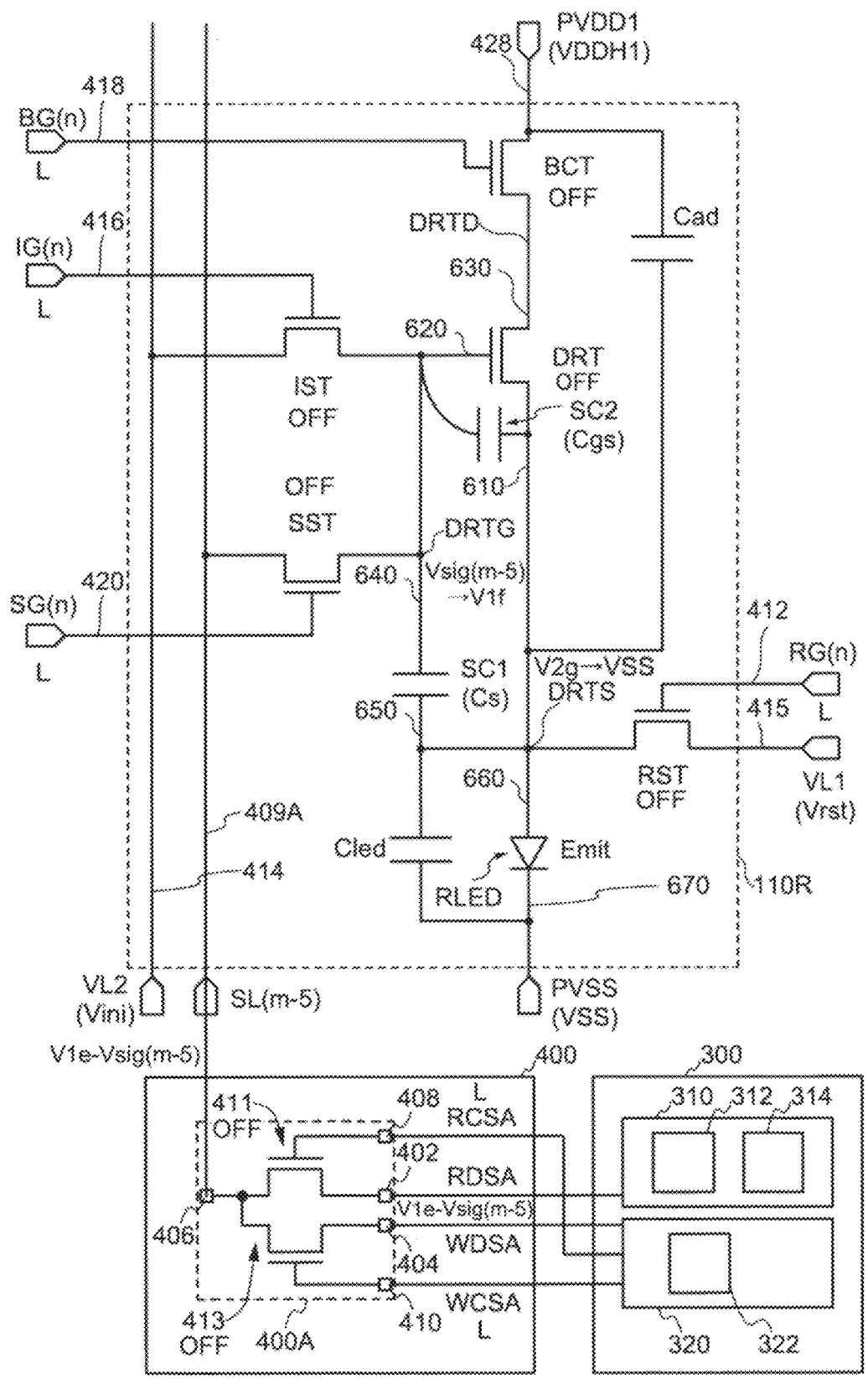
FIG. 19 is a schematic diagram showing a pixel circuit and a read/write selection circuit after the sixth period shown in FIG. 16.

FIG. 16 is a schematic diagram showing a timing chart for generating a PUF-ID of the authentication device 10 according to an embodiment of the present invention. FIG. 9 to FIG. 11 are schematic diagrams showing the pixel circuit 130 and the read/write selection circuit 107 in a fourth period shown in FIG. 16. FIG. 12 to FIG. 14 are schematic diagrams showing the pixel circuit 130 and the read/write selection circuit 107 in a fifth period shown in FIG. 16. FIG. 15 is a schematic diagram showing the pixel circuit 130 and the read/write selection circuit 107 in a sixth period shown in FIG. 16. FIG. 17 to FIG. 19 are schematic diagrams showing the pixel circuit 130 and the read/write selection circuit 107 in the sixth period shown in FIG. 16. The driving method of the authentication device 10 is not limited to the driving method shown in FIG. 8 to FIG. 19. Descriptions of the same or similar configurations as those in FIG. 1 to FIG. 15 will be omitted.

Since a part of the fourth period, the fifth period, and the sixth period shown in FIG. 16 is the same as a part of the first period, the second period, and the third period shown in FIG. 8 to FIG. 15, descriptions thereof will be omitted. Since the driving method of the authentication device 10 shown in FIG. 16 is different from the driving method of the authentication device 10 shown in FIG. 8 in the operations after the time t32, the operations after the time t32 will be mainly described.

[1-6-1. Data Read-Out and PUF Data Acquisition Operation in Sixth Period]

The data read-out and PUF data acquisition operation (hereinafter referred to as a PUF data acquisition operation) is an operation that acquires PUF data specific to the display device 100 and generates a PUF-ID. The sixth time period is the time t31 to the time t34. Since the operation in the time t31 to the time t32 is the same as the operation described in "1-5-4. Light-Emitting Operation in Third Period", the explanation thereof will be omitted.

Timings of various signals from the time t32 to the time t33 will be described with reference to FIG. 16 or FIG. 17. As shown in FIG. 16, from the time t32 to the time t33, the scanning signal SG (n) and the read-out control signal RCSA change from a low level to a high level, and the high level is supplied to the scanning signal SG (n) and the read-out control signal RCSA. The light emission control signal BG (n) is maintained at the high level, and the reset signal RG (n), the initialization control signal IG (n), and the write control signal WCSA are maintained at the low level. Therefore, as shown in FIG. 17, the light emission control transistor BCT is in the conductive state (ON), and the initialization transistor IST, the reset transistor RST, and the second transistor 413 are in the non-conductive state (OFF). On the other hand, the select transistor SST and the first transistor 411 change from the non-conductive state (OFF) to the conductive state (ON). In addition, the drive transistor DRT changes from the non-conductive state (OFF) to the conductive state (ON) according to the voltages supplied to the first node DRTG, the second node DRTS, and the third node DRTD.

As shown in FIG. 16 or FIG. 17, since the light emission control transistor BCT becomes conductive (ON), the light emission control transistor BCT is electrically connected to the first drive power line PVDD1 (the drive power line 428), and the first drive voltage VDDH1 is supplied to the third electrode 630 (the third node DRTD) of the drive transistor DRT. Since the select transistor SST and the first transistor 411 became conductive (ON), the charges of the gate electrode 620 (the first node DRTG) of the drive transistor DRT are extracted. As a result, the voltage of the first node DRTG decreases, and the driving capability of the drive transistor DRT decreases. In this case, the voltage of the source electrode 610 (the second node DRTS) of the drive transistor DRT is such that the current flowing through the drive transistor DRT and the current flowing through the light-emitting element RLED are balanced. The voltage of the second node DRTS decreases when the current flowing through the drive transistor DRT decreases. As a result, the voltage of the second node DRTS decreases from the voltage V2f to a voltage V2g. In addition, since the voltage of the second node DRTS decreases to the voltage V2g, the voltage of the gate electrode 620 (the first node DRTG) of the drive transistor DRT decreases from, for example, the voltage V1e to the voltage Vsig (m-5) due to the capacitive coupling of the capacitive element SC1 and the capacitive element SC2 and is fixed to the voltage Vsig.

As described above, a current flows through the drive transistor DRT from the first drive power line PVDD1 toward the first electrode 660 of the light-emitting element RLED (the drive transistor DRT is in the conductive state). Therefore, the source electrode 610 of the drive transistor DRT and the second electrode 650 (i.e., the second node DRTS) of the capacitive element SC1 are charged. The voltage between the first node DRTG and the second node DRTS changes from V1e–V2f to Vsig (m-5)–V2g. For example, the voltage (V1e–V2f) is the same or substantially the same as the voltage (V1d–V2e), and the voltage between the first node DRTG and the second node DRTS are maintained at {Vsig (m-5)–(Vini–Vth)}. The voltage between the first node DRTG and the second node DRTS is the voltage Vgs between the gate electrode 620 and the source electrode 610 of the drive transistor DRT. The voltage Vgs is a voltage obtained by correcting the threshold voltage Vth of the drive transistor DRT.

For example, in this case, at the moment when the voltage of the gate electrode of the initialization transistor IST or the select transistor SST changes, the voltage of the drain electrode (that is, the voltage of the first node DRTG) of the initialization transistor IST or the select transistor SST may change momentarily due to coupling with the capacitance (not shown) between the initialization transistor IST or the select transistor SST and the gate electrode 620 of the drive transistor DRT. This is the so-called feedthrough and this instantaneous voltage is the voltage associated with the feedthrough. Although a detailed explanation is omitted, the voltage of the first node DRTG may include a voltage associated with the feedthrough (referred to herein as a feedthrough voltage).

From the time t32 to the time t33, the drive transistor DRT causes a current to flow according to the voltage applied to each electrode, and a current equivalent to the current flowing through the drive transistor DRT flows to the light-emitting element RLED, so that the light-emitting element RLED emits light (Emit).

In addition, as described in "1-5-4. Light-Emitting Operation in Third Period", for example, the voltage V1e of the gate electrode 620 of the drive transistor DRT (that is, the voltage of the first node DRTG) is Vsig (m-5)–(Vini–Vth)+Vled. When the select transistor SST and the first transistor 411 become conductive, the display device 100 transmits the read-out data signal RDSA containing the voltage Vsig (m-5)–(Vini–Vth)+Vled×Cs/(Cs+Cad+Cled) to the PUF-ID generation circuit 310 through the gate electrode 620 (the first node DRTG) of the drive transistor DRT, the select transistor SST, the data signal line 409A, the data signal line connection terminal 406, the second transistor 413, and the read-out terminal 402.

That is, the PUF-ID generation circuit 310 reads out the read-out data containing the voltage of the first node DRTG and acquires the PUF data specific to the sub-pixel 120A. In addition, since the read-out data contains information (data) including the threshold voltage Vth of the drive transistor DRT, the PUF-ID generation circuit 310 (the authentication device 10) can acquire the threshold voltage (that is, the variation in the threshold voltage) for each pixel. As described above, the authentication device 10 executes the data read-out and PUF data acquisition operation in the sixth period.

[1-6-2. Operation from Time t33 to Time t34 in Sixth Period]

From the time t33 to the time t34, the display device 100 is in an operation for stopping the data read-out and PUF data acquisition operation.

Timings of various signals from the time t33 to the time t34 will be described with reference to FIG. 16 or FIG. 18. As shown in FIG. 16, from the time t33 to the time t34, the scanning signal SG (n) and the read-out control signal RCSA change from a high level to a low level, and the low level is supplied to the scanning signal SG (n) and the read-out control signal RCSA. The light emission control signal BG (n) is maintained at the high level, and the reset signal RG (n), the initialization control signal IG (n), and the write control signal WCSA are maintained at the low level. Therefore, as shown in FIG. 18, the light emission control transistor BCT is in the conductive state (ON), and the initialization transistor IST, the reset transistor RST, and the second transistor 413 are in the non-conductive state (OFF). On the other hand, the select transistor SST and the first transistor 411 change from the conductive state (ON) to the non-conductive state (OFF). In addition, the drive transistor DRT changes from the conductive state (ON) to the non-conductive state (OFF) according to the voltages supplied to the first node DRTG, the second node DRTS, and the third node DRTD.

As shown in FIG. 16 or FIG. 18, as the light emission control transistor BCT continues to be in the conductive state (ON), the light emission control transistor BCT is electrically connected to the first drive power line PVDD1 (the drive power line 428), and the first drive voltage VDDH1 is continuously supplied to the third electrode 630 (the third node DRTD) of the drive transistor DRT. Therefore, the voltage of the source electrode 610 (the second node DRTS) of the drive transistor DRT is kept fixed to the voltage V2g, and the voltage of the gate electrode 620 (the first node DRTG) of the drive transistor DRT is kept fixed to the voltage Vsig (m-5). In addition, as the select transistor SST and the first transistor 411 change to the non-conductive state (OFF), the voltage Vsig (m-5) of the gate electrode 620 of the drive transistor DRT is not transmitted to the PUF-ID generation circuit 310.

As described above, a current flows through the drive transistor DRT from the first drive power line PVDD1 toward the first electrode 660 of the light-emitting element RLED (the drive transistor DRT is in the conductive state). Therefore, the voltage between the first node DRTG and the second node DRTS is maintained at {Vsig (m-5)−(Vini-Vth)}. The voltage between the first node DRTG and the second node DRTS is the voltage Vgs between the gate electrode 620 and the source electrode 610 of the drive transistor DRT. The voltage Vgs is a voltage obtained by correcting the threshold voltage Vth of the drive transistor DRT.

From the time t33 to the time t34, the drive transistor DRT causes a current to flow according to the voltage applied to each electrode, and a current equivalent to the current flowing through the drive transistor DRT flows to the light-emitting element RLED, so that the light-emitting element RLED emits light (Emit).

[1-7. Operation After Time t34]

After the time t34, the display device 100 is in an operation for stopping the light emission.

Timings of various signals at the time t34 will be described with reference to FIG. 16 or FIG. 19. As shown in FIG. 19, after the time t34, the light emission control signal BG (n) changes from a high level to a low level, and the low level is supplied to the light emission control signal BG (n). The reset signal RG (n), the initialization control signal IG (n), the scanning signal SG (n), the read-out control signal RCSA, and the write control signal WCSA are maintained at the low level. Therefore, as shown in FIG. 19, the initialization transistor IST, the reset transistor RST, the select transistor SST, the first transistor 411, and the second transistor 413 are in the non-conductive state (OFF). On the other hand, the light emission control transistor BCT changes from the conductive state (ON) to the non-conductive state (OFF).

As shown in FIG. 16 or FIG. 19, as the light emission control transistor BCT becomes non-conductive (OFF), the current from the first drive power line PVDD1 to the first electrode 660 of the light-emitting element RLED is interrupted by the light emission control transistor BCT. As a result, for example, the voltage of the source electrode 610 (the second node DRTS) of the drive transistor DRT decreases from the voltage V2g to the reference voltage VSS and is fixed to the reference voltage VSS. In addition, as the voltage of the source electrode 610 (the second node DRTS) of the drive transistor DRT decreases to the reference voltage VSS, the voltage of the gate electrode 620 (the first node DRTG) of the drive transistor DRT decreases from, for example, the voltage Vsig (m-5) to a voltage V1f due to the capacitive coupling of the capacitive element SC1 and the capacitive element SC2 and is fixed to the voltage V1f.

As described above, the current from the first drive power line PVDD1 to the first electrode 660 of the light-emitting element RLED is interrupted by the light emission control transistor BCT. Therefore, the light-emitting element RLED becomes non-light-emitting.

As described above, a series of operations of the light-emitting element driving unit 110R of the sub-pixel 120A is completed. Similar to the light-emitting element driving unit 110R, the operation of the light-emitting element driving unit 110G of the sub-pixel 120B and the operation of the light-emitting element driving unit 110B of the sub-pixel 120C are also completed. The operation in one subframe period (e.g., the first subframe period) is completed when the operation is completed from each sub-pixel in the first row to the sub-pixel in the last row of the scanning signal line. The same operation is repeatedly executed in a plurality of subframe periods (e.g., the second subframe period, the third subframe period, . . . ). In this way, the read-out data can be read out from the display device 100 within one frame, and the PUF data specific to the display device 100 can be obtained.

For example, the PUF-ID generation circuit 310 serially transmits the plurality of acquired PUF data (voltages included in the read-out data signal RDSA) to the integration circuit 312. The integration circuit 312 integrates the plurality of acquired PUF data at a predetermined time, and then converts the integrated voltage into a digital signal using the AD converter 314. Subsequently, the PUF-ID generation circuit 310 may generate the PUF-ID specific to the authentication device 10 (the display device 100) using data (information) converted into the digital signal.

The authentication device 10 and the driving method of the authentication device 10 can correct the threshold using the display device 100 including the light-emitting element LED, read out a read-out signal containing the voltage corresponding to the charge associated with the threshold correction, and generate the PUF-ID specific to the display device 100 including the light-emitting element LED using the voltage. As a result, unauthorized use of the authentication device 10 and the driving method of the authentication device 10 using the display device can be suppressed by managing the authentication device 10 using the generated PUF-ID. In addition, since the authentication device 10 and the driving method of the authentication device 10 can manage the authentication device 10 by using the PUF-ID specific to the display device, it is possible to enhance individual authentication and ensure security.

[1-8. Configuration of Collimator 1100]

Figure 20A:
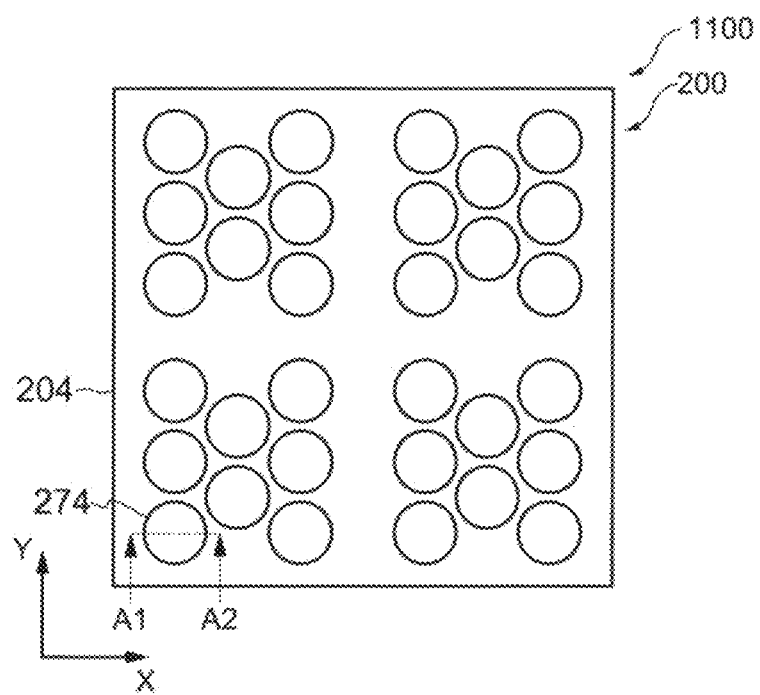
FIG. 20A is a schematic diagram showing a part of a cross section of an authentication device according to an embodiment of the present invention.

A configuration of the collimator 1100 included in the authentication device 10 according to an embodiment of the present invention will be described with reference to FIG. 20A and FIG. 20B. FIG. 20A is a schematic diagram showing a part of a cross section of the authentication device 10 according to an embodiment of the present invention, and FIG. 20B is an end portion cross-sectional view showing a cross section along A1 and A2 of FIG. 20A.

As described in "1-1. Configuration of Authentication Device 10", the detection device 200 is adhered to the collimator 1100 using the adhesive sheet 1020. As shown in FIG. 20A or FIG. 20B, the collimator 1100 is stacked on an upper surface of the detection device 200, and the surface of the collimator 1100 has a plurality of micro lenses 274. In addition, the detection device 200 has a plurality of photoelectric conversion elements 252 in the detection unit 204. Each of the plurality of micro lenses 274 is arranged in a one-to-one manner above each of the plurality of photoelectric conversion elements 252 in the direction Z.

Figure 20B:
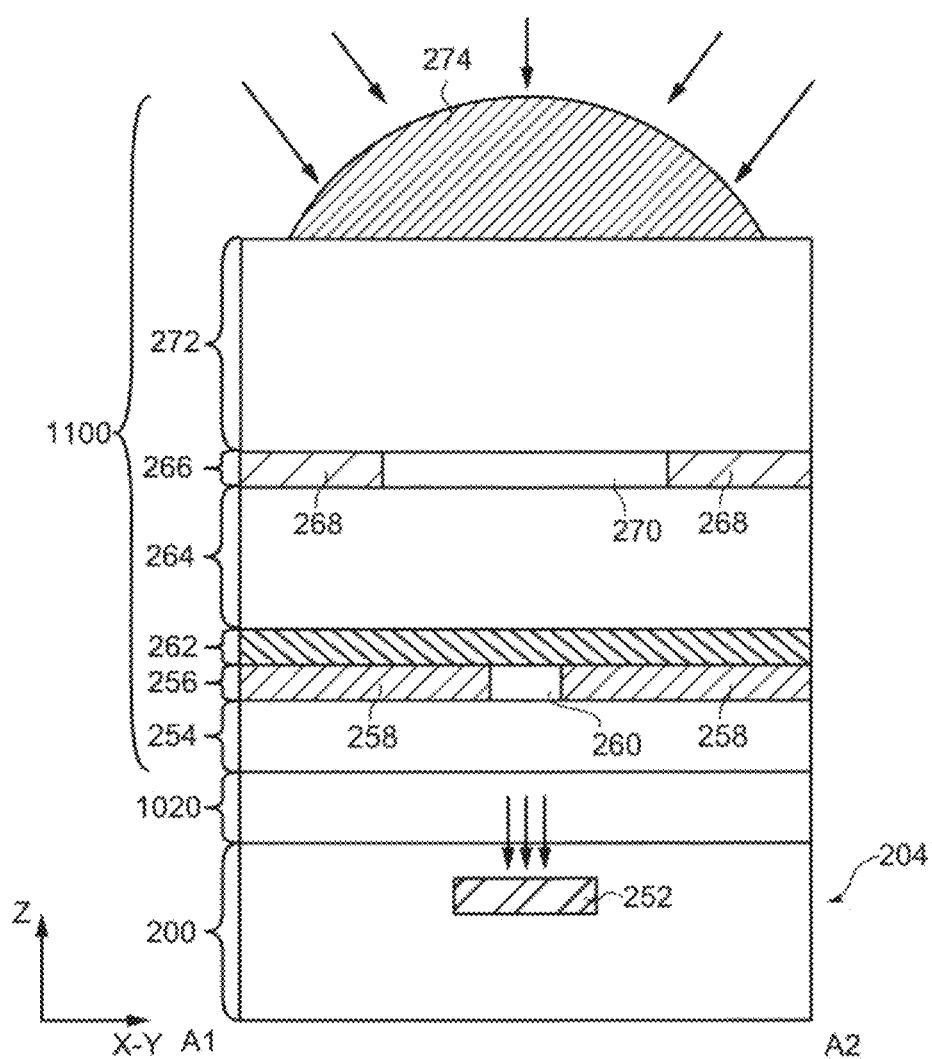
FIG. 20B is a cross-sectional view showing a cross-section along A1 and A2 of FIG. 20A.

As shown in FIG. 20B, in the collimator 1100, an organic insulating layer 254, a first light shielding layer 256, an IR cut filter 262, an organic resin layer 264, a second light shielding layer 266, an organic insulating layer 272, and the micro lens 274 are stacked in this order in the direction Z from the bottom to the top.

The first light shielding layer 256 includes a conductive film 258 and an organic resin film 260 arranged in a pinhole opened in the conductive film 258. In addition, the second light shielding layer 266 includes an organic resin layer 268 and an organic resin layer 270 arranged in a pinhole opened in the organic resin layer 268. The pinhole opened in the conductive film 258 is smaller than the pinhole opened in the organic resin layer 268, and parallel light is efficiently collected on the photoelectric conversion element 252.

Further, the organic resin layer 268 is a so-called black matrix and is formed using a black plastic. The organic insulating layer 272 is formed using a transparent or semi-transparent plastic.

[1-9. Authentication Method Using Authentication Device 10]

Figure 22:
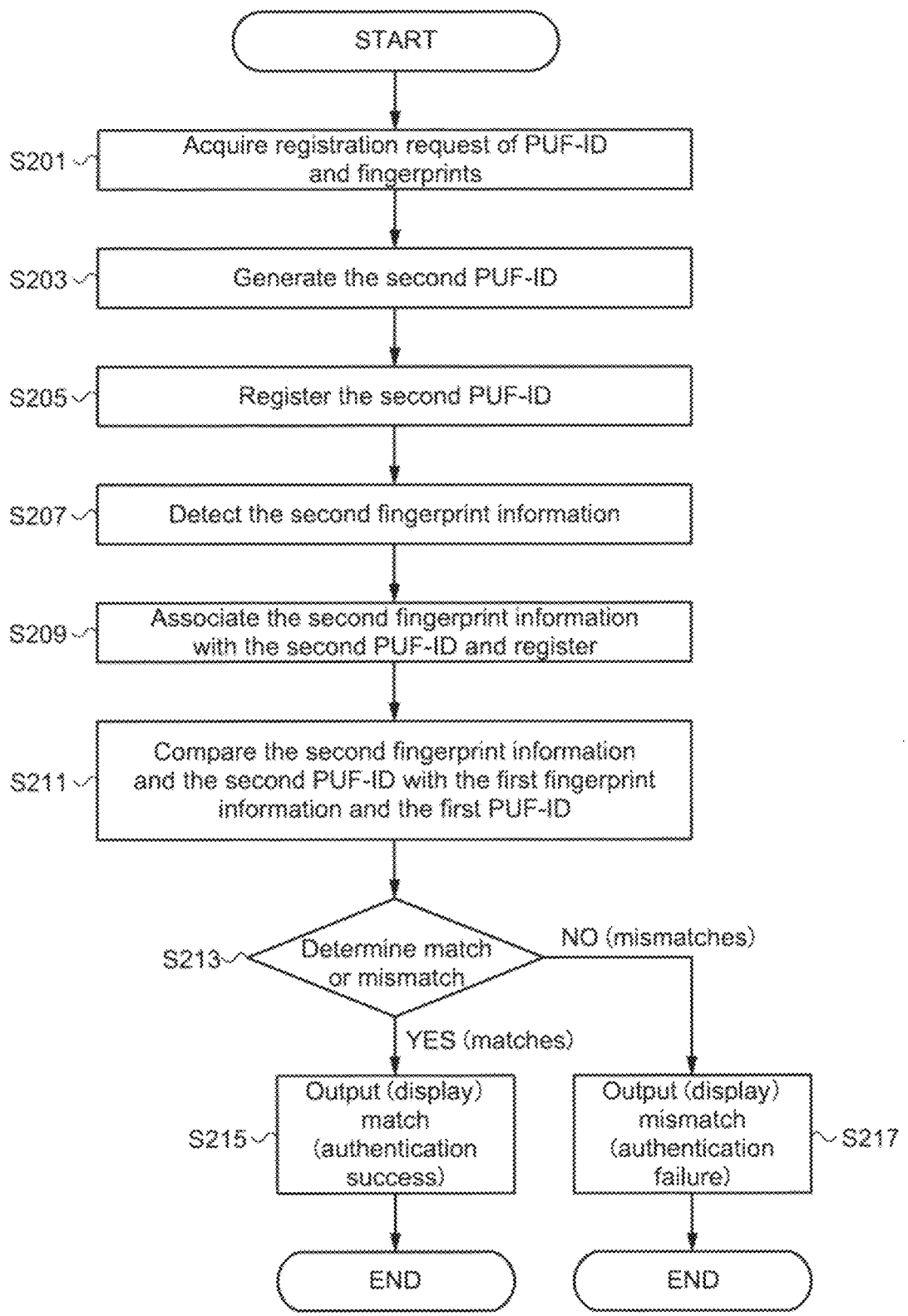
FIG. 22 is a flowchart showing an authentication method using an authentication device according to an embodiment of the present invention.

FIG. 21 is a flowchart showing a method of registering a PUF-ID and first fingerprint information in the authentication method using the authentication device 10 according to an embodiment of the present invention. FIG. 22 is a flowchart showing a method of authenticating the registered PUF-ID and first fingerprint information using the flowchart shown in FIG. 21. The authentication method of the authentication device 10 is not limited to the authentication method shown in FIG. 21 and FIG. 22. Descriptions of the same or similar configurations as those in FIGS. 1 to 20 will be omitted.

The association and registration of the first PUF-ID (first ID) and the fingerprint information will be described with reference to FIG. 21. As shown in FIG. 21, when the association and registration of the first PUF-ID (the first ID) and the fingerprint information are started, for example, in step 101 (S101), the user of the authentication device 10 requests (registration request) the authentication device 10 to register the information (first fingerprint information) of the first ID and the touched fingerprint (FP). For example, when the user touches the vicinity of the display unit 104 of the display device 100, the detection device 200 of the authentication device 10 receives the registration request. The registration request is transmitted to the display device control circuit 320 and the detection device control circuit 330, and the display device control circuit 320 and the detection device control circuit 330 process the registration request. The registration request is also transmitted to the server 500, and the server 500 processes the registration request.

In step 103 (S103), the display device control circuit 320 transmits a first control signal to the display device 100 and the PUF-ID generation circuit 310 to acquire the PUF data from the display device 100 and generate the first ID. The display device 100 and the PUF-ID generation circuit 310 receive the first control signal and acquire the PUF data and generate the first ID based on, for example, "1-5. Driving Method for Displaying Image on Authentication Device 10", "1-6. Driving Method for Generating PUF-ID of Authentication Device 10", and "1-7. Operation After Time t34".

For example, in step 105 (S105), the first ID is stored in the memory circuit 340 and the first ID is registered with the authentication device 10.

In step 107 (S107), the detection unit 204 of the detection device 200 detects the first fingerprint information of the user touching the vicinity of the display unit 104 of the display device 100, and generates a detection signal containing the first fingerprint information. The detection device 200 transmits the detection signal containing the first fingerprint information to the detection device control circuit 330. The detection device control circuit 330 receives the detection signal containing the first fingerprint information.

For example, in step 109 (S109), the detection device control circuit 330 reads out the first ID from the memory circuit 340 and associates the first ID with the first fingerprint information. In addition, the detection device control circuit 330 transmits the associated first ID and the first fingerprint information to the memory circuit 340. The associated first ID and the first fingerprint information are transmitted to the memory circuit 340 and the memory circuit 370, and are stored and registered in the authentication device and the server 500.

Further, in step 105 (S105), the generated first ID may be transmitted to the memory circuit 370 and stored, and the first ID may be registered with the server 500. Subsequently, in step 107 (S107), the detection device 200 may transmit the detection signal containing the first fingerprint information to the memory circuit 370. Further, for example, in step 109 (S109), the first ID and the first fingerprint information are read out from the memory circuit 370 in the server 500, the first ID is associated with the first fingerprint information, and the associated first ID and the first fingerprint information may be transmitted to the memory circuit 370.

As described above, registration of the first ID and the first fingerprint information is completed.

Next, authentication of the associated first ID and first fingerprint information and an associated second ID and second fingerprint information will be described with reference to FIG. 22. As shown in FIG. 22, when association and authentication of the second PUF-ID (the second ID) and the fingerprint information are started, for example, in step 201 (S201), the user of the authentication device 10 registers the second ID and the information (the second fingerprint information) of the touched fingerprint (FP) in the authentication device 10, and requests (authentication request) authentication. For example, when the user touches the vicinity of the display unit 104 of the display device 100, the detection device 200 of the authentication device 10 receives the authentication request. The authentication request is transmitted to the display device control circuit 320 and the detection device control circuit 330, and the display device control circuit 320 and the detection device control circuit 330 process the authentication request. The authentication request is also transmitted to the server 500, and the server 500 processes the authentication request.

Since step 203 (S203), step 205 (S205), step 207 (S207), and step 209 (S209) are processes in which the first ID and the first fingerprint information in step 103 (S103), step 105 (S105), step 107 (S107), and step 109 (S109) are replaced with the second ID and the second fingerprint information, the detailed explanation thereof is omitted.

Following step 209 (S209), in step 211 (S211), the server 500 receives a second control signal based on the authentication request from the user. The comparison circuit 350 in the server 500 receives the second control signal based on the authentication request from the user, and reads out the pre-registered associated first ID and first fingerprint information and the associated second ID and second fingerprint information from the memory circuit 370. The comparison circuit 350 compares the pre-registered associated first ID and first fingerprint information with the associated second ID and second fingerprint information, and generates a comparison result. In addition, the comparison circuit 350 transmits the comparison result to the determination circuit 360.

Subsequently, in step 213 (S213), the determination circuit 360 receives the comparison result, and uses the comparison result to determine whether the pre-registered associated first PUF-ID and first fingerprint information match the associated second PUF-ID and second fingerprint information. For example, in the case of including information in which the pre-registered associated first PUF-ID and first fingerprint information matches the associated second PUF-ID and second fingerprint information, the determination circuit 360 determines that the information matches (YES in step S213), and the authentication device 10 executes step 215 (S215). In the case of including information in which the pre-registered associated first PUF-ID and first fingerprint information do not match the associated second PUF-ID and second fingerprint information, the determination circuit 360 determines that the information does not match (NO in step S213), and the authentication device 10 executes step 217 (S217).

In step 215 (S215), for example, the determination circuit 360 transmits a first comparison signal containing information (the first determination result) in which the comparison result matches the display device control circuit 320. The display device control circuit 320 controls the display device 100 to output (display) the match (e.g., successful authentication) to the display unit 104 based on the first comparison signal.

In step 217 (S217), for example, the determination circuit 360 transmits a second comparison signal containing information (the second determination result) in which the comparison result does not match the display device control circuit 320. The display device control circuit 320 controls the display device 100 to output (display) the mismatches (e.g., authentication failure) to the display unit 104 based on the second comparison result.

As described above, authentication of the associated first ID and first fingerprint information and the associated second PUF-ID and second fingerprint information is completed.

As described above, in the authentication device 10 and the driving method of the authentication device 10 according to the embodiment of the present invention, the PUF-ID generation circuit 310 can be used to associate and register the specific PUF-ID of the display device 100 with the fingerprint information of the user. In addition, in the authentication device 10 and the driving method of the authentication device 10, the PUF-ID generation circuit 310 can be used to match the specific PUF-ID of the display device 100 with the user's fingerprint information for authentication. Therefore, unauthorized use using the display device 100 can be suppressed, and it is possible to enhance individual authentication and ensure security.

2. Second Embodiment

Figure 24:
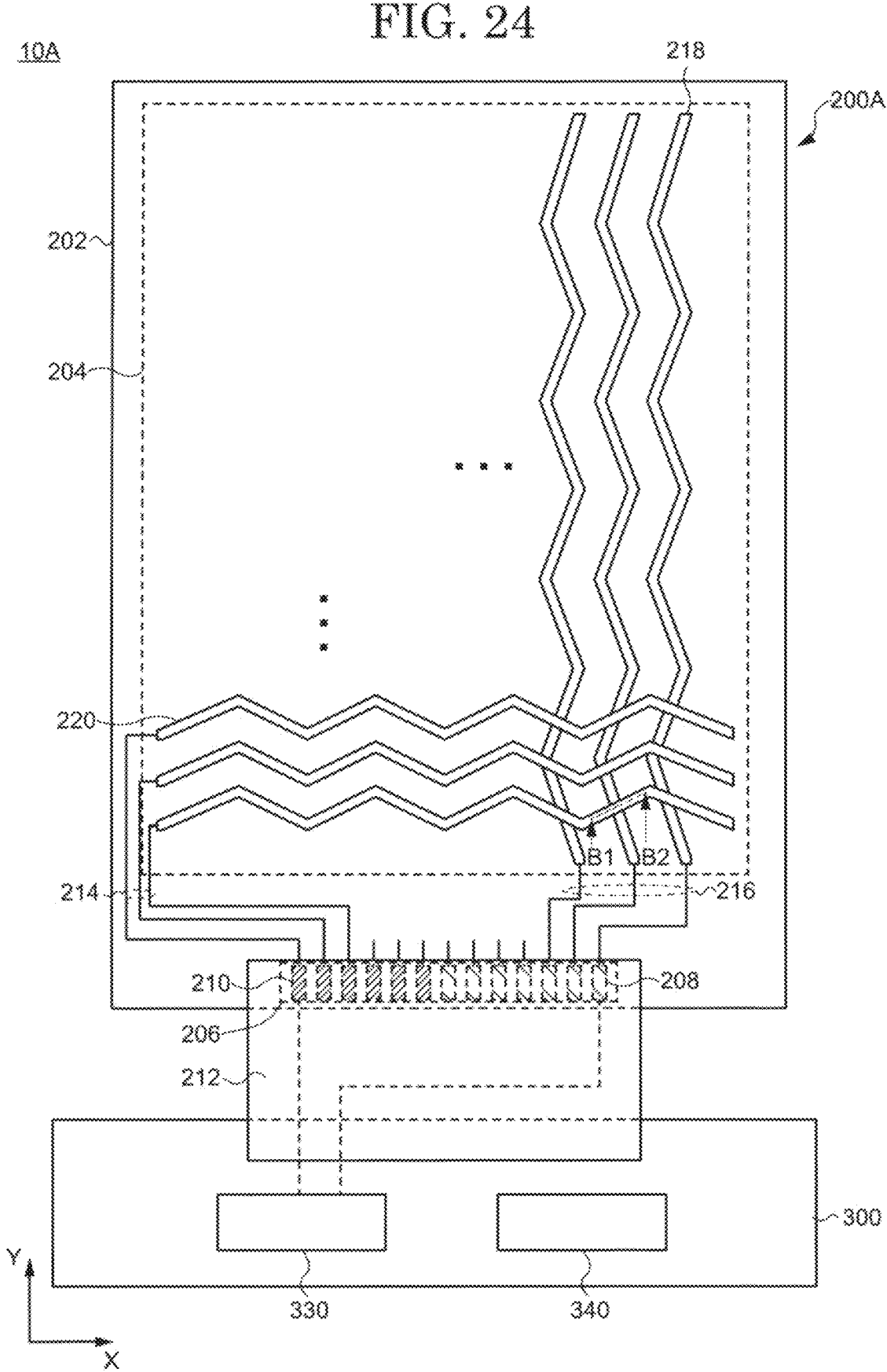
FIG. 24 is a schematic diagram showing a configuration of a detection device and a control device according to the second embodiment of the present invention.
Figure 25:
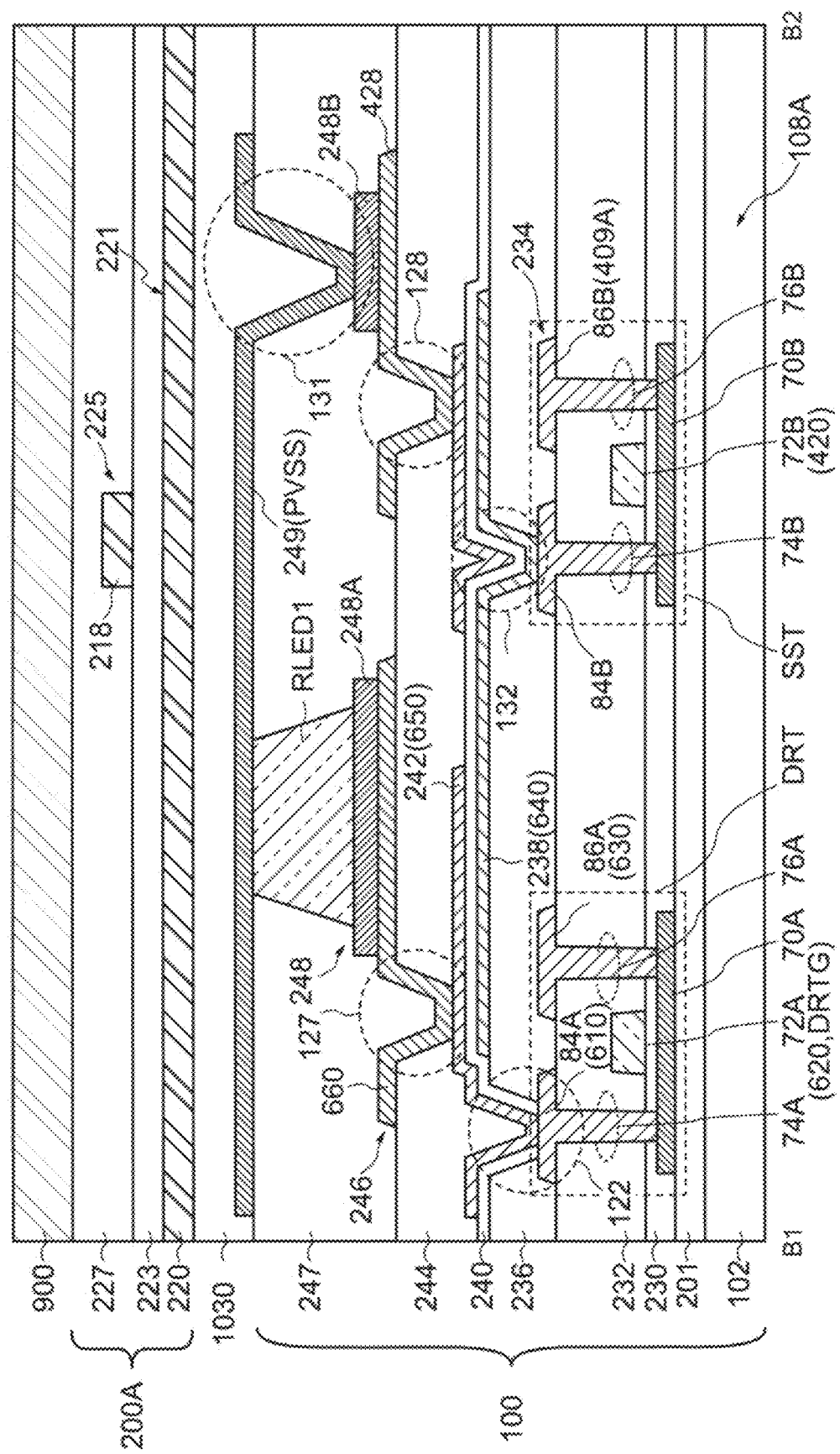
FIG. 25 is a schematic cross-sectional view showing a configuration of an authentication according to the second embodiment of the present invention.

FIG. 23 is a schematic cross-sectional view showing a configuration of an authentication device 10A according to the second embodiment. FIG. 24 is a schematic diagram showing a configuration of a detection device 200A and the control device 300 according to the second embodiment. FIG. 25 is a schematic cross-sectional view showing a configuration of the authentication device 10A according to the second embodiment. The configuration of the authentication device 10A is not limited to the configuration shown in FIG. 23 to FIG. 25. The same or similar configurations as those in FIG. 1 to FIG. 22 will not be described here.

The authentication device 10A does not include the interference filter 800, the adhesive sheet 1000, the adhesive sheet 1010, the adhesive sheet 1020, and the collimator 1100 as compared with the authentication device 10. In addition, as shown in FIG. 23, the authentication device 10A is different from the authentication device 10 in that the display device 100, an adhesive sheet 1030, the detection device 200A, and the polarizing plate 900 are arranged in this order from the bottom to the top with respect to the direction Z. In the authentication device 10A, since the other points are the same as those of the authentication device 10, points different from the authentication device 10 will be mainly described.

As shown in FIG. 24, the detection device 200A includes the detection unit 204, a plurality of second electrodes 218 and a plurality of first electrodes 220 arranged in the detection unit 204. The second electrode 218 is referred to as an Rx electrode, and the first electrode 220 is referred to as a Tx electrode. In addition, the detection device 200A includes a substrate 202, an FPC substrate 212, a terminal unit 206, a wiring 214, and a wiring 216. The terminal unit 206 includes a plurality of terminals 210 and a plurality of terminals 208. The plurality of terminals 210, the plurality of terminals 208, the wiring 214, the wiring 216, the plurality of second electrodes 218, and the plurality of first electrodes 220 are arranged on an upper surface of the substrate 202. The detection device 200A is electrically connected to the control device 300 separately from the display device 100.

For example, the circular polarizing plate can be used as the polarizing plate 900 also in the authentication device 10A.

The plurality of first electrodes 220 is arranged parallel in the direction X (row direction) in a top view, and the plurality of second electrodes 218 is arranged parallel in the direction Y (column direction) in a top view.

For example, a plurality of wirings 216 is electrically connected to the plurality of second electrodes 218. In addition, the plurality of wirings 216 is electrically connected to the plurality of terminals 208 in a one-to-one manner. Similar to the plurality of wirings 216, for example, a plurality of wirings 214 is electrically connected to the plurality of first electrodes 220. For example, the plurality of first electrodes 220 is electrically connected to the plurality of terminals 210 in a one-to-one manner. For example, the second electrode 218 is electrically connected to the detection device control circuit 330 through the wiring 216, the terminal 208, and the FPC substrate 212. In addition, the first electrode 220 is electrically connected to the detection device control circuit 330 through the wiring 214, the terminal 210, and the FPC substrate 212.

The plurality of second electrodes 218 and the plurality of first electrodes 220 may read out the read-out data using the signal supplied from the detection device control circuit 330, and the detection device 200A may detect the object to be detected.

The plurality of terminals 208 and the plurality of terminals 210 may be formed to be aligned with one side of the detection device 200A. Therefore, the single FPC substrate 212 may be used to supply a signal for controlling the read-out and the read-out signal to the first electrode 220 and the second electrode 218 or to receive from the first electrode 220 and the second electrode 218.

For example, the detection device control circuit 330 may generate one or more signals for controlling the read-out. In addition, the generated signal may be a plurality of the same signals, a plurality of signals different from each other, or a plurality of signals consisting of the same signals and a plurality of signals different from each other.

In this case, a driving method of the detection device 200A will be briefly described exemplifying the mutual capacitance method. For example, in the mutual capacitance method, the capacitance generated between the object to be detected and the first electrode 220 and the second electrode 218 is subtracted from the parasitic capacitance in the first electrode 220 and the second electrode 218 when the object to be detected touches the detection device 200A. The detection device 200A can acquire the fingerprint information of the object to be detected by reading the change (generating the read signal) using the signal for controlling the read-out. In addition, the position at which the object to be detected touches the detection device 200A is detected. Further, the operation of the detection device 200A is not limited to the example described herein. The operation of the detection device 200A may use a self-capacitance method.

For example, the detection device 200A acquires the user's fingerprint information and supplies a signal containing the fingerprint information to the detection device control circuit 330. The detection device control circuit 330 may transmit the signal containing the fingerprint information to the memory circuit 340 and store the fingerprint information in the memory circuit 340.

Next, a cross-sectional configuration of the authentication device 10A will be described with reference to FIG. 25. In the display device 100, semiconductor films 70A and 70B are arranged on the upper surface of the substrate 102 via an optional base layer 201.

The drive transistor DRT and the select transistor SST of the light-emitting element driving unit 110R are arranged on the upper side of the base layer 201. The drive transistor DRT includes the semiconductor film 70A, a gate insulating layer 230, a gate electrode 72A (620, DRTG), a source electrode 84A (610), and a drain electrode 86A (630). The select transistor SST includes the semiconductor film 70B, the gate insulating layer 230, a gate electrode 72B, a source electrode 84B, and a drain electrode 86B. The source electrode or drain electrode may be formed by implanting an impurity into the semiconductor films 70A and 70B. The drain electrode 86B is electrically connected to the data signal line 409A. The gate electrode 72B is electrically connected to the scanning signal line 420.

Each of the gate electrodes 72A and 72B overlaps the semiconductor films 70A and 70B with the gate insulating layer 230 interposed therebetween. An area where the semiconductor films overlap the gate electrode is a channel area of each transistor. Each semiconductor film may include a source and a drain area so as to sandwich the channel area. An insulating layer 232 is arranged on the gate electrode.

Each of the source electrode 84A (610), the drain electrode 86A (630), the source electrode 84B, and the drain electrode 86B is electrically connected to each of the semiconductor films 70A and 70B via openings 74A, 76A, 74B, and 76B exposing a portion of the insulating layer 232 or the gate insulating layer 230.

An organic insulating layer 236 is arranged on a conductive layer 234. The organic insulating layer 236 has an opening 122 that exposes a portion of the conductive layer 234. A conductive layer 238, an insulating layer 240, and a conductive layer 242 are arranged on the organic insulating layer 236 in this order. The insulating layer 240 has the opening 122 that exposes a portion of the conductive layer 234. The conductive layer 242 is electrically connected to the conductive layer 234 via the opening 122.

An organic insulating layer 244 is arranged on the conductive layer 242. The organic insulating layer 244 has an opening 127 and an opening 128. A portion of the conductive layer 242 is exposed at the opening 127 and the opening 128. A conductive layer 246 and a conductive layer 248 are arranged on the organic insulating layer 244 in this order. The conductive layer 246 is electrically connected to the conductive layer 242 via the opening 127. In addition, the conductive layer 246 is electrically connected to the conductive layer 242 via the opening 128.

An organic insulating layer 247 is arranged such that the light-emitting element RLED is embedded in the organic insulating layer 247. Although not shown, the light-emitting element GLED and the light-emitting element BLED are also arranged so as to be embedded in the organic insulating layer 247 in the same manner as the light-emitting element RLED. The organic insulating layer 247 has an opening 131 exposing a portion of the conductive layer 248. A conductive layer 249 is arranged on the organic insulating layer 247 and electrically connected to an electrode 248B via the opening 131.

The insulating layer 232 is arranged on each transistor. The insulating layer 232 has a function of absorbing unevenness caused by transistors and other devices and providing a flat surface. An organic compound material selected from acryl, polyimide, and the like, which have excellent film surface flatness properties, can be used for the insulating layer 232.

The source electrode 84A (610), the drain electrode 86A (630), the source electrode 84B, the drain electrode 86B (630), the data signal line 409A, the first drive power line PVDD1, the wiring 124, and the wiring 126, and the like are arranged in the conductive layer 234. The conductive layer 234 may be connected to the gate electrode 72A (620) and the gate electrode 72B by the opening which exposes a portion of the insulating layer 232 or the gate insulating layer 230. In addition, the gate electrode 72A (620) and the gate electrode 72B are arranged in the conductive layer 234 on a side where the gate insulating layer 230 is arranged. For example, a metal such as aluminum (Al), titanium (Ti), molybdenum (Mo), copper (Cu), or tungsten (W), or an alloy thereof can be used as the conductive layer 234 and a material of each gate electrode. In addition, the conductive layer 234 can be a single layer or a stacked layer.

For example, the first electrode 640 of the capacitive element SC1 and the first electrode 640 of the capacitive element SC2 are arranged in the conductive layer 238. For example, a transparent conductive material such as indium tin oxide (ITO) or indium zinc oxide (IZO) can be used as a material of the conductive layer 238.

The conductive layer 242 may function as a wiring layer for connecting the conductive layer 234 and the conductive layer 246. For example, the second electrode 650 of the second the capacitive element SC1 is arranged on the conductive layer 242. A material similar to that of the conductive layer 234 and a similar configuration can be used as the material of the conductive layer 242.

The conductive layer 246 may function as an electrode pad for implementing the light-emitting element RLED, the light-emitting element GLED, and the light-emitting element BLED. For example, the first electrode 660 of the light-emitting element RLED is arranged on the conductive layer 246. In addition, the conductive layer 246 may function as a reflective layer that reflects light emitted from the light-emitting element RLED, the light-emitting element GLED, and the light-emitting element BLED. A material similar to that of the conductive layer 234 and a similar configuration can be used as the material of the conductive layer 246.

The conductive layer 248 may function as a bonding layer for bonding the light-emitting element RLED, the light-emitting element GLED, and the light-emitting element BLED. For example, silver-paste, solder, or an anisotropic conductive film (ACF) can be used as the conductive layer 248. For example, the light-emitting element RLED may be electrically connected to the conductive layer 246 (660) using an electrode 248A. The first electrode 660 is formed using the conductive layer 246.

The conductive layer 249 may function as a wiring layer for drawing a cathode electrode, such as the first electrode 660 of the light-emitting element RLED, the first electrode 660 of the light-emitting element GLED, and the first electrode 660 of the light-emitting element BLED. That is, the reference voltage line PVSS connected to the cathode electrode or functioning as the cathode electrode is arranged in the conductive layer 249. In addition, the conductive layer 249 may function as a transmission layer that transmits light emitted from the light-emitting element RLED, the light-emitting element GLED, and the light-emitting element BLED. For example, a transparent conductive material such as indium tin oxide (ITO) or indium zinc oxide (IZO) can be used as the conductive layer 249.

The insulating layer 240 may separate and insulate the conductive layer 238 and the conductive layer 242. For example, an inorganic insulating material such as silicon oxide ($SiO_x$), silicon oxynitride ($SiO_xN_y$), silicon nitride ($SiN_x$), silicon nitride oxide ($SiN_xO_y$), aluminum oxide ($AlO_x$), aluminum oxynitride ($AlO_xN_y$), aluminum nitride oxide ($AlN_xO_y$), or aluminum nitride ($AlN_x$) can be used as a material of the insulating layer 240. In this case, $SiO_xN_y$ and $AlO_xN_y$ are a silicon compound and an aluminum compound that contains less nitrogen (N) than oxygen (O). In addition, $SiN_xO_y$ and $AlN_xO_y$ are a silicon compound and an aluminum compound that contains less oxygen than nitrogen. In addition, not only an inorganic insulating material but also an organic insulating material can be used as the insulating layer 240. For example, a polyimide resin, an acryl resin, an epoxy resin, a silicone resin, a fluororesin, or a siloxane resin can be used as the organic insulating material. An inorganic insulating layer material and an organic insulating material may be used alone or stacked as the insulating layer 240.

For example, an organic resin such as a polyimide resin, an acryl resin, an epoxy resin, a silicone resin, a fluororesin, or a siloxane resin can be used as each material of the organic insulating layer 236 and the organic insulating layer 244, which may flatten the unevenness of the layers positioned below each of the organic insulating layer 236 and the organic insulating layer 244. Each of the organic insulating layer 236 and the organic insulating layer 244 may be used alone or stacked.

The organic insulating layer 247 can reduce and flatten steps between the light-emitting element RLED, the light-emitting element GLED, and the light-emitting element BLED when forming the conductive layer 249. For example, a photosensitive organic material such as photosensitive acryl or photosensitive polyimide can be used as a material of the organic insulating layer 247.

The display device 100 may have the stacked structure described above. The display device 100 has the above-described stacked structure, and a decrease in the long-term reliability of the display device 100 is suppressed.

The detection device 200A is adhered to the upper surface of the display device 100 using the adhesive sheet 1030. A conductive layer 221 is adhered to the adhesive sheet 1030. For example, the first electrode 220 is formed in the conductive layer 221. An inorganic insulating film 223 is formed above the conductive layer 221. A conductive layer 225 is formed above the inorganic insulating film 223. For example, the second electrode 218 is formed in the conductive layer 225. An organic insulating layer 227 is formed above the conductive layer 225. The polarizing plate 900 is arranged on the organic insulating layer 227. Similar to the authentication device 10, the polarizing plate 900 contains an adhesive sheet and the polarizing plate 900 may be adhered to the detection device 200A using the adhesive sheet. The authentication device 10A is formed as described above.

3. Third Embodiment

Figure 26:
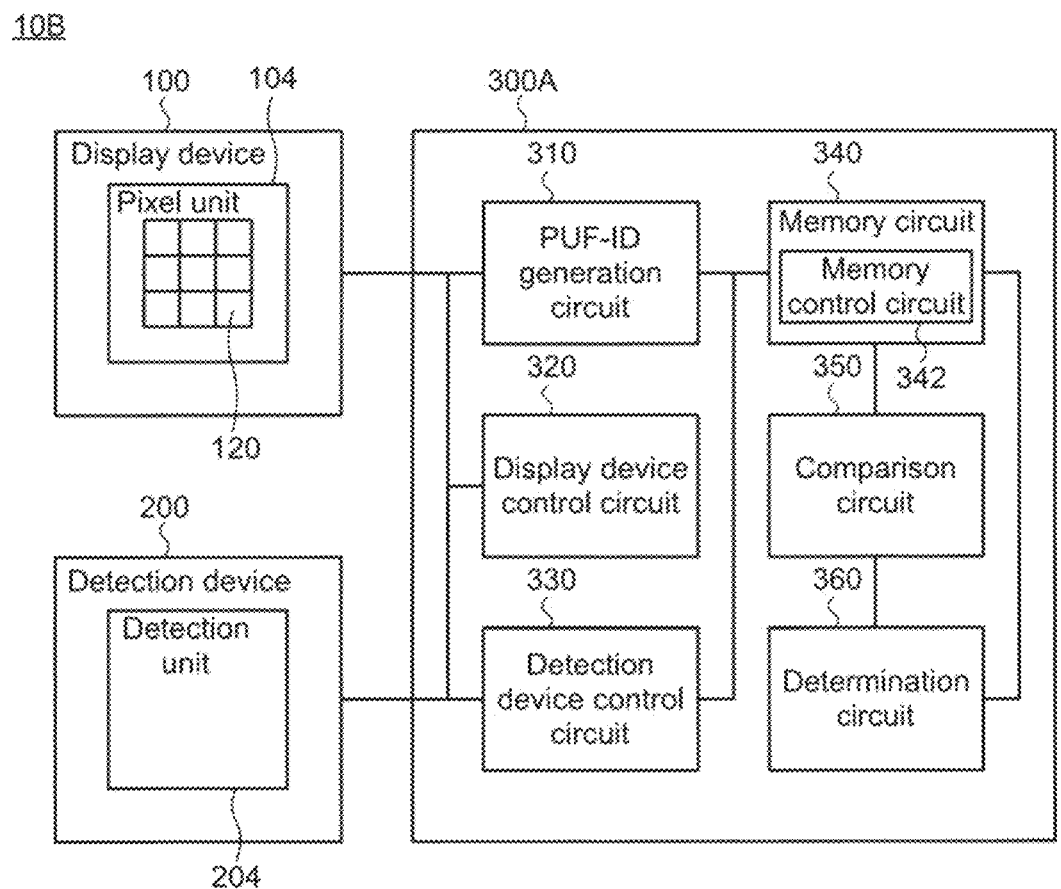
FIG. 26 is a schematic diagram showing a configuration of an authentication device according to a third embodiment of the present invention.

FIG. 26 is a schematic diagram showing a configuration of an authentication device 10B according to a third embodiment. A configuration of the authentication device 10B is not limited to the configuration shown in FIG. 26. The same or similar configurations as those in FIG. 1 to FIG. 25 will not be described here.

[3-1. Configuration of Authentication Device 101B]

While the authentication device 10 does not include the comparison circuit 350 and the determination circuit 360 in the control device 300, the authentication device 10B includes the comparison circuit 350 and the determination circuit 360 in a control device 300A. Since the authentication device 10B is the same as the authentication device 10 except for that point, points different from the authentication device 10 will be mainly described in the third embodiment.

For example, the authentication device 10B is configured to be able to communicate with a server (not shown) in a wireless network. Similar to the first embodiment, the server may provide an application, a program, or the like to the authentication device 10B. The authentication device 10B may store the application, the program, or the like in the memory circuit 340. In addition, the authentication device 10B can execute a driving mode using a driving method for displaying an image on the authentication device 10B, a driving mode using a driving method for generating a PUF-ID of the authentication device 10B, or an authentication mode using an authentication method using the authentication device 10B, and the like using the application or the program.

The control device 300A includes the comparison circuit 350 and the determination circuit 360. The comparison circuit 350 is electrically connected to the determination circuit 360, and the comparison circuit 350 and the determination circuit 360 are electrically connected to the memory circuit 340. The memory circuit 340 includes a configuration and a function similar to those of the memory circuit 370.

[3-2. Authentication Method Using Authentication Device 10B]

The authentication method using the authentication device 10B is a method based on the flowcharts of FIG. 21 and FIG. 22, similar to the authentication method using the authentication device 10. The authentication method using the authentication device 10B will be described with reference to the flowcharts of FIG. 21 and FIG. 22. In the explanation of the authentication method using the authentication device 10B, points different from the authentication device 10 will be explained.

Since steps 101 (S101), step 103 (S103), step 105 (S105), step 107 (S107), step 201 (S201), step 203 (S203), step 205 (S205), step 207 (S207), step 209 (S209), step 213 (S213), step 215 (S215), and step 217 (S217) are the same as those of the authentication method using the authentication device 10, the explanation in the third embodiment will be omitted.

In step 109 (S109), the associated first ID and the first fingerprint information are transmitted and stored in the memory circuit 340 and registered in the authentication device 10B. After the step 109 (S109), registration of the associated first ID and the first fingerprint information is completed.

In step 211 (S211), the comparison circuit 350 receives the second control signal based on the authentication request from the user and reads out the pre-registered associated first ID and first fingerprint information and the associated second ID and second fingerprint information from the memory circuit 340. The comparison circuit 350 compares the pre-registered associated first 1ID and first fingerprint information with the associated second ID and second fingerprint information, and generates a comparison result. The comparison circuit 350 transmits the comparison result to the determination circuit 360.

After step 211 (S211), either of step 213 (S213) and step 215 (S215) or step 217 (S217) is executed, and the authentication of the associated first ID and first fingerprint information and the associated second PUF-ID and second fingerprint information is completed.

Even when the authentication device 10B and the driving method of the authentication device 10B according to the third embodiment are used, as in the first embodiment, unauthorized use using the display device 100 can be suppressed, and it is possible to enhance individual authentication and ensure security.

Furthermore, each of the embodiments or a part of each of the embodiments described above as an embodiment of the present invention can be appropriately combined and implemented as long as no contradiction is caused.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. An authentication device comprising:
   a display device including at least a first transistor, a source signal line electrically connected to a gate electrode of the first transistor, a power line electrically connected to a source electrode of the first transistor, a photoelectric conversion element having a first electrode connected to a drain electrode of the first transistor, and a capacitive element connected between the gate electrode and the drain electrode;
   a detecting device detecting and generating a signal of biological information; and
   a control circuit connected to the display device and the detecting device and configured to control
      driving in a first period including resetting the drain electrode, initializing the gate electrode of the first transistor,
      storing a first charge corresponding to a threshold voltage of the first transistor in the capacitive element, and correcting the threshold voltage of the first transistor,
      driving in a second period after the first period including transmitting a signal containing image data for causing the photoelectric conversion element to emit light to the gate electrode, and adding a second charge corresponding to the image data to the first charge of the capacitive element; and
      driving in a third period after the second period including causing the photoelectric conversion element to emit light, reading out a voltage corresponding to the first charge and the second charge, and generating a PUF-ID using the voltage.

2. The authentication device according to claim 1, wherein the biological information is fingerprint information.

3. The authentication device according to claim 2, wherein
   the control circuit has a PUF-ID generation circuit,
   the PUF-ID generation circuit generates a first PUF-ID when a registration request is received, and generates a second PUF-ID when an authentication request is received, and
   the PUF-ID includes the first PUF-ID and the second PUF-ID.

4. The authentication device according to claim 3, further comprising:
   a configuration capable of detecting first fingerprint information when the registration request is received and detecting second fingerprint information when the authentication request is received, wherein
   the fingerprint information includes the first fingerprint information and the second fingerprint information.

5. The authentication device according to claim 4, wherein
   the control circuit has a comparison circuit and a determination circuit,
   the comparison circuit compares the first PUF-ID and the first fingerprint information with the second PUF-ID and the second fingerprint information to generate a comparison result, and
   the determination circuit performs individual authentication using the comparison result.

6. The authentication device according to claim 4, further comprising:
a read/write selection circuit, wherein
the read/write selection circuit has a second transistor and a third transistor electrically connected to the gate electrode,
when displaying an image using the first transistor, the control circuit turns on the second transistor, turns off the third transistor, and transmits the signal containing image data to the gate electrode, and
when generating the PUF-ID, the control circuit turns off the second transistor, turns on the third transistor, and receives a read-out signal containing read data containing the voltage from the gate electrode.

7. A driving method of an authentication device comprising:
a display device including at least a first transistor, a source signal line electrically connected to a gate electrode of the first transistor, a power line electrically connected to a source electrode of the first transistor, a photoelectric conversion element having a first electrode connected to a drain electrode of the first transistor, and a capacitive element connected between the gate electrode and the drain electrode; and a control circuit generating a PUF-ID; controlling;
reset of the drain electrode;
initializing the gate electrode of the first transistor;
storing a first charge corresponding to a threshold voltage of the first transistor in the capacitive element;
correcting the threshold voltage of the first transistor;
transmitting a signal containing image data for causing the photoelectric conversion element to emit light to the gate electrode;
adding a second charge corresponding to the image data to the first charge of the capacitive element;
causing the photoelectric conversion element to emit light;
reading out a voltage corresponding to the first charge and the second charge; and
generating a PUF-ID using the voltage;
detecting and generating biological information; and
associating the biological information with the PUF-ID.

8. The driving method of the authentication device according to claim 7,
wherein the biological information is fingerprint information.

9. The driving method of the authentication device according to claim 8, further comprising:
generating a first PUF-ID when a registration request is received; and
generating a second PUF-ID when an authentication request is received; wherein
the PUF-ID includes the first PUF-ID and the second PUF-ID.

10. The driving method of the authentication device according to claim 9, further comprising:
a configuration capable of detecting first fingerprint information when the registration request is received and detecting second fingerprint information when the authentication request is received, wherein
the fingerprint information includes the first fingerprint information and the second fingerprint information.

11. The driving method of the authentication device according to claim 10, wherein
the control circuit has a comparison circuit and a determination circuit,
the comparison circuit compares the first PUF-ID and the first fingerprint information with the second PUF-ID and the second fingerprint information to generate a comparison result, and
the determination circuit performs individual authentication using the comparison result.

12. The driving method of the authentication device according to claim 11, wherein
the display device has a read/write selection circuit having a second transistor and a third transistor electrically connected to the gate electrode,
when displaying an image using the first transistor,
the second transistor is turned on,
the third transistor is turned off, and
the signal containing image data is transmitted to the gate electrode, and
when generating the PUF-ID,
the second transistor is turned off,
the third transistor is turned on, and
a read signal containing read data containing the voltage is received from the gate electrode.

* * * * *